United States Patent [19]
Yuuki et al.

[11] Patent Number: 5,146,520
[45] Date of Patent: Sep. 8, 1992

[54] OPTICAL COUPLER AND METHOD OF PRODUCING THE SAME

[75] Inventors: Hayato Yuuki, Suzuka; Takeharu Ito, Yokkaichi, all of Japan

[73] Assignee: Sumitomo Wiring Systems, Ltd., Mie, Japan

[21] Appl. No.: 642,266

[22] Filed: Jan. 16, 1991

[30] Foreign Application Priority Data

| Jan. 26, 1990 | [JP] | Japan | 2-17554 |
| May 21, 1990 | [JP] | Japan | 2-131962 |
| May 28, 1990 | [JP] | Japan | 2-137964 |
| Aug. 6, 1990 | [JP] | Japan | 2-208345 |

[51] Int. Cl.$^5$ .................................................. G02B 6/26
[52] U.S. Cl. ............................................... 385/45; 385/24; 385/51
[58] Field of Search ............... 350/96.15, 96.16, 320; 156/73.1, 73.2, 73.3; 385/15, 24, 39, 42, 43, 45, 46, 51

[56] References Cited

U.S. PATENT DOCUMENTS

| 4,265,689 | 5/1981 | Jeffrey | 385/98 X |
| 4,560,427 | 12/1985 | Flood | 156/73.3 |
| 4,686,136 | 8/1987 | Homonoff et al. | 428/286 |
| 4,923,268 | 5/1990 | Xu | 350/96.15 |
| 4,997,247 | 3/1991 | Stowe | 385/50 |

FOREIGN PATENT DOCUMENTS

| 51-14031 | 2/1976 | Japan . |
| 62-153906 | 7/1987 | Japan . |

Primary Examiner—John D. Lee
Attorney, Agent, or Firm—Sughrue, Mion, Zinn Macpeak & Seas

[57] ABSTRACT

The present invention is directed to an optical coupler, only formed by a plurality of all plastic fibers, and a method of producing the same. Two all plastic fibers each of which has a core are placed in contact with each other over a predetermined length. Ultrasonic vibration is applied to a contacting portion of the all plastic fibers so as to bond the cores with each other at the contacting portion. Thus, the optical coupler with a low-excess-loss can easily be produced.

15 Claims, 20 Drawing Sheets

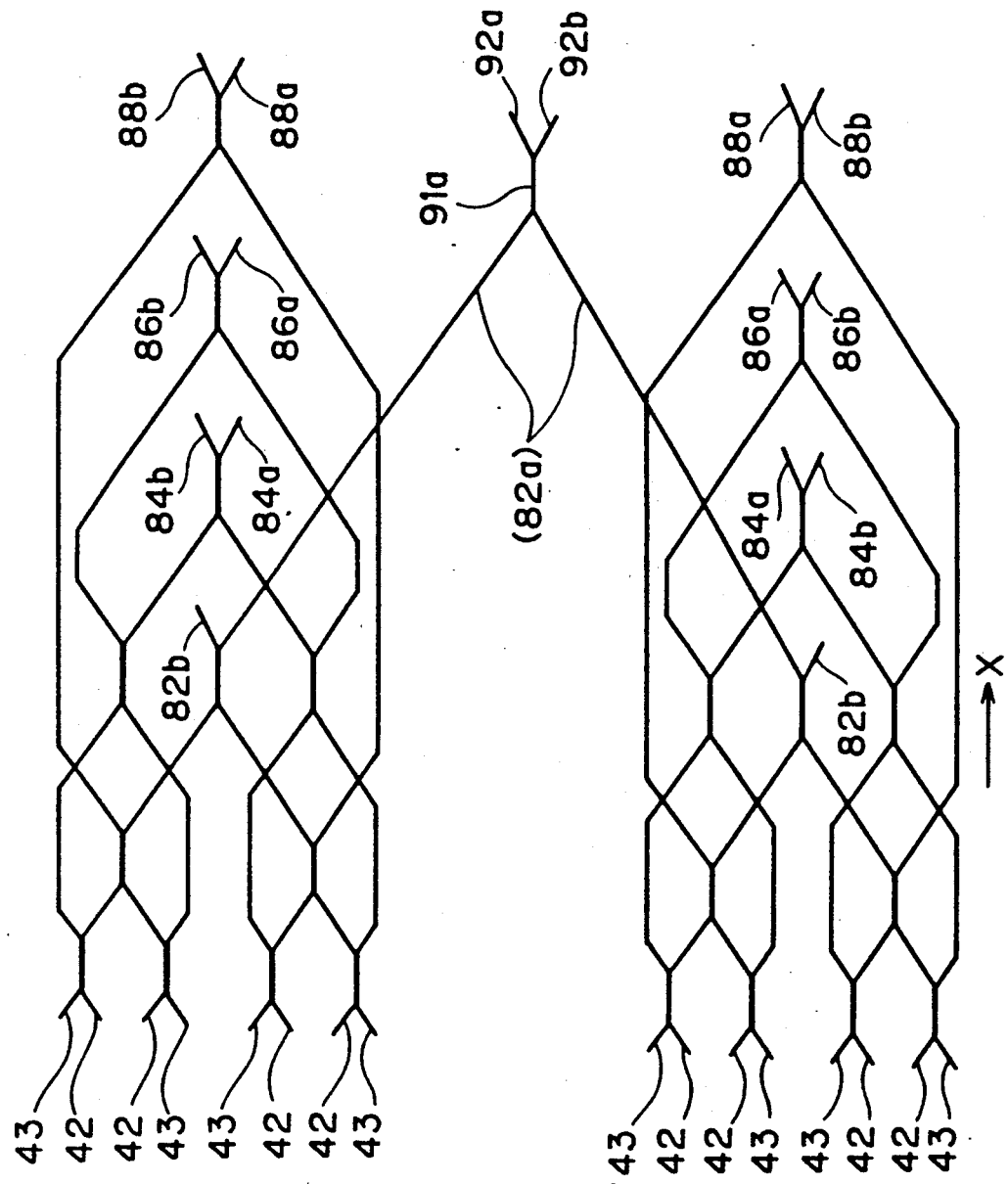

OPTICAL COUPLER AND METHOD OF PRODUCING THE SAME

BACKGROUND OF THE INVENTION

1. Field of the Invention

The present invention relates to an optical coupler and a method of producing the same, and more particularly, it relates an optical coupler which comprises a plurality of all plastic fibers.

2. Description of the Prior Art

The Japanese Patent Laid-Open Gazette No. 62-153906 discloses an optical coupler (See FIG. 1). The optical coupler is formed by a plurality of optical fibers 1 each of which has a core 1a and a clad 1b surrounding the core 1a. More precisely, intermediate portions 2 of the optical fibers 1 are dipped in sulfuric acid to remove the clads therefrom, following which the optical fibers 1 are bundled up while the intermediate portions thereof being in contact with each other. Then, the exposed cores 1a are thermally fused together.

The prior art is employed with glass fibers in which a core 1a is made of glass material such as quartz, and therefore requires further improvement when employed with all plastic fibers in which a core 1a is made of plastic material. This is because: Cores 1a are thermally fused after bundled up in intermediate portions 2. This causes the cores 1a in intermediate portions 2 to shrink upon. Consequently, optical loss such as excess loss increases. In addition, clads 1b near the intermediate portion 2 would also be heated during fusing, causing serious problems in the all plastic fibers 1. The problems with the all plastic fibers 1 include deformation due to the molten clads 1b and deteriorated characteristics resulting from diffusing the clad material into the cores 1a. Diffusion of the clad material is particularly problematic because it largely increases optical loss.

SUMMARY OF THE INVENTION

The present invention is directed to a method of producing an optical coupler. The method comprises the steps of: preparing two all plastic fibers each of which has a core extending in a predetermined direction; placing the all plastic fibers in contact with each other over a predetermined length; and applying ultrasonic vibration to the contacting portion of the all plastic fibers so as to bond the cores with each other at the contacting portion.

The present invention is also directed to an optical coupler. The optical coupler comprises: a plurality of all plastic fibers disposed in branching off relation, each of the all plastic fiber having a core; and a plurality of bonding portions at which two cores of the all plastic fibers are bonded with each other, wherein each downstream portion of the all plastic fiber in the upstream side is fused to an upstream portion of the all plastic fiber in the downstream side at every bonding portion.

The present invention is also directed to a method of producing the above optical coupler. The method comprises the steps of: preparing a plurality of all plastic fibers each of which has a core; placing the all plastic fibers in branching off relation, each downstream portion of the all plastic fiber in the upstream side being in contact with an upstream portion of the all plastic fiber in the downstream side; and applying ultrasonic vibration to the contacting portions of the all plastic fibers so as to bond the cores with each other at every contacting portion.

The present invention is also directed to an optical coupler. The optical coupler comprises: a first all plastic fiber; a plurality of second all plastic fibers disposed in branching off relation from a downstream portion of the first all plastic fiber, each downstream portion of the all plastic fiber in the upstream side being in contact with an upstream portion of the all plastic fiber in the downstream side; a plurality of third all plastic fibers disposed in branching off relation from an upstream portion of the first all plastic fiber, each downstream portion of the all plastic fiber in the upstream side being in contact with an upstream portion of the all plastic fiber in the downstream side, each of the first to third all plastic fibers having a core; and a plurality of bonding portions at which two cores of the all plastic fibers are bonded with each other, wherein each downstream portion of the all plastic fiber in the upstream side is fused to an upstream portion of the all plastic fiber in the downstream side at every bonding portion.

The present invention is also directed to a method of producing the above optical coupler. The method comprises the steps of: preparing a first all plastic fiber; placing a plurality of second all plastic fibers in branching off relation from a downstream portion of the first all plastic fiber, each downstream portion of the all plastic fiber in the upstream side being in contact with an upstream portion of the all plastic fiber in the downstream side; placing a plurality of third all plastic fibers in branching off relation from an upstream portion of the first all plastic fiber, each downstream portion of the all plastic fiber in the upstream side being in contact with an upstream portion of the all plastic fiber in the downstream side, each of the first to third all plastic fibers having a core; and applying ultrasonic vibration to the contacting portions of the all plastic fibers so as to bond the cores with each other at every contacting portion.

The present invention is also directed to an optical coupler. The optical coupler comprises: a first and a second optical coupler each of which has $2^n$ ($n \geq 1$) input fiber branches and $2^n$ output fiber branches, the input fiber branches serving as an input port, the output fiber branches serving as an output port; and a plurality of bonding portions at which two cores of the all plastic fibers are bonded with each other, wherein the output fiber branches of the first optical coupler are fused to the output fiber branches of the second optical coupler with a one-to-one correspondence, whereby the bonding portions are formed.

The present invention is also directed to a method of producing the above optical coupler. The method comprises the steps of: preparing a first and a second optical coupler each of which has $2^n$ ($n \geq 1$) input fiber branches and $2^n$ output fiber branches, the input fiber branches serving as an input port, the output fiber branches serving as an output port; placing the output fiber branches of the first optical coupler in contact with the output fiber branches of the second optical coupler with a one-to-one correspondence; and applying ultrasonic vibration to the contacting portions of the all plastic fibers so as to bond the cores with each other at every contacting portion.

Accordingly, the first object of the present invention is to provide a low-excess-loss optical coupler.

The second object of the present invention is to provide a method of producing a low-excess-loss optical coupler.

The third object of the present invention is, on attainment of the second object, to simplify manufacturing process of the low-excess-loss optical coupler.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 14A to 14C are schematic views showing the manufacturing procedure for an optical coupler according to a ninth embodiment of the present invention, respectively;

DESCRIPTION OF THE PREFERRED EMBODIMENTS

A. Apparatus for Manufacturing Optical Coupler

Figure 2:
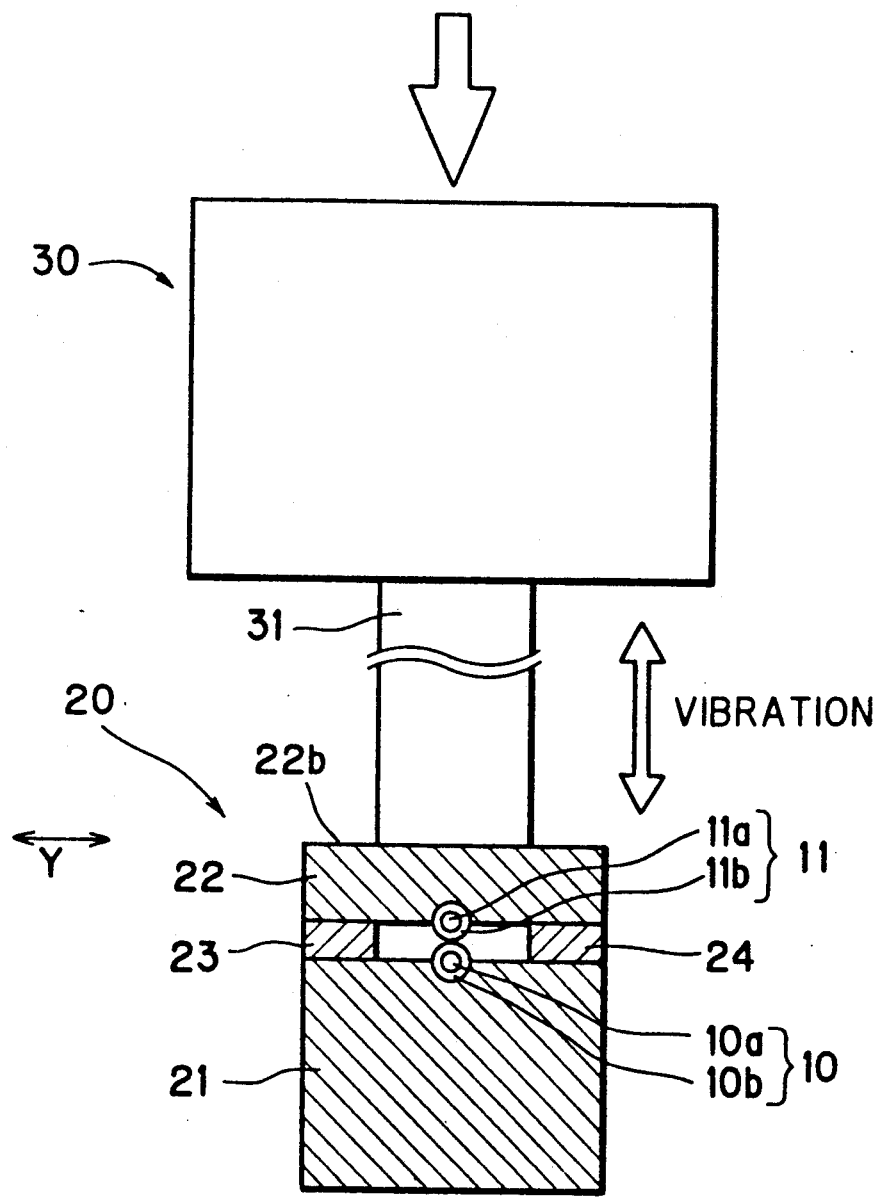
FIG. 2 is a view of an apparatus for manufacturing an optical coupler according to the present invention.
Figure 3A:
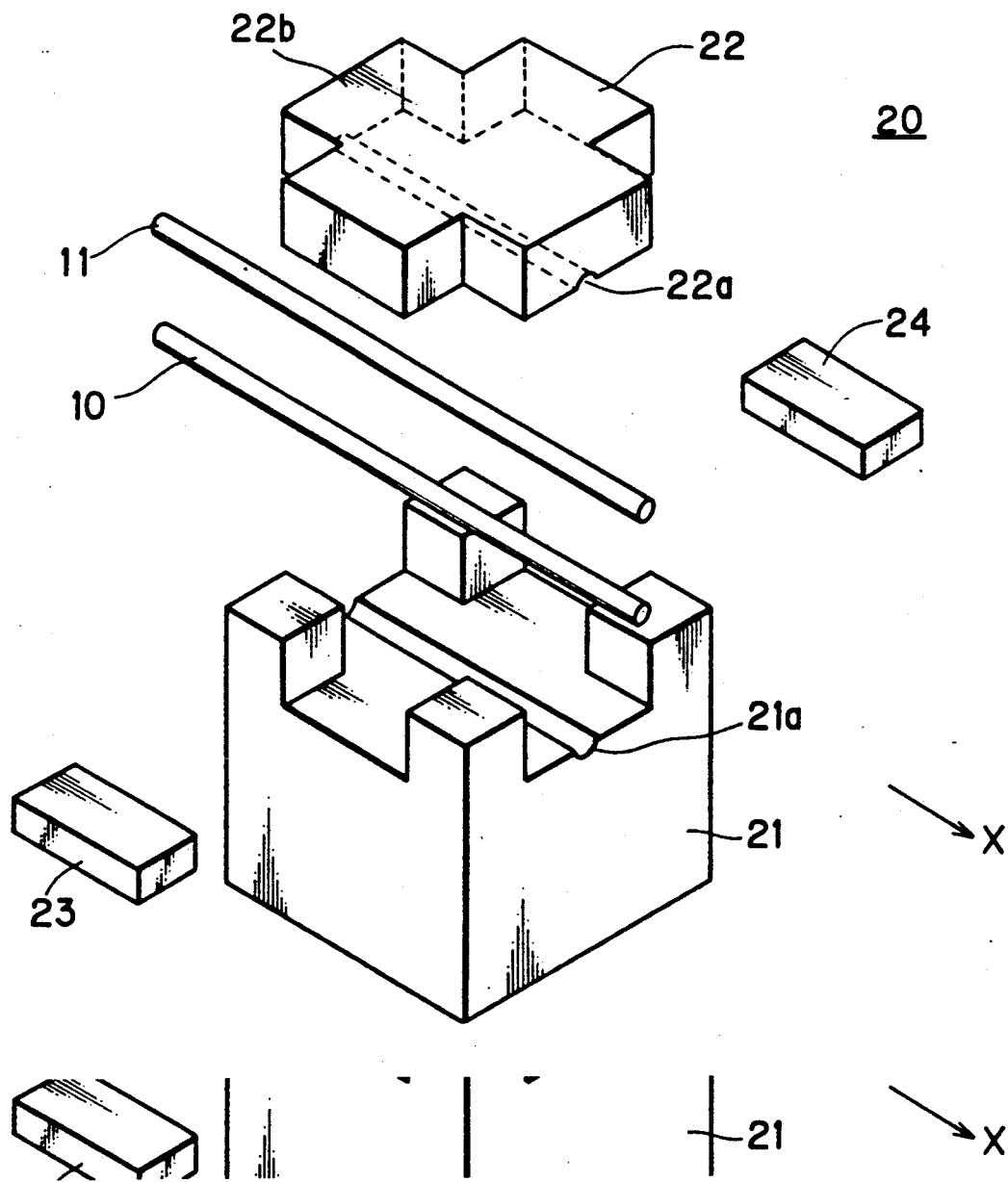
FIGS. 3A, 3B and 4 are perspective views explaining the embodiments of the present invention, respectively.
Figure 3B:
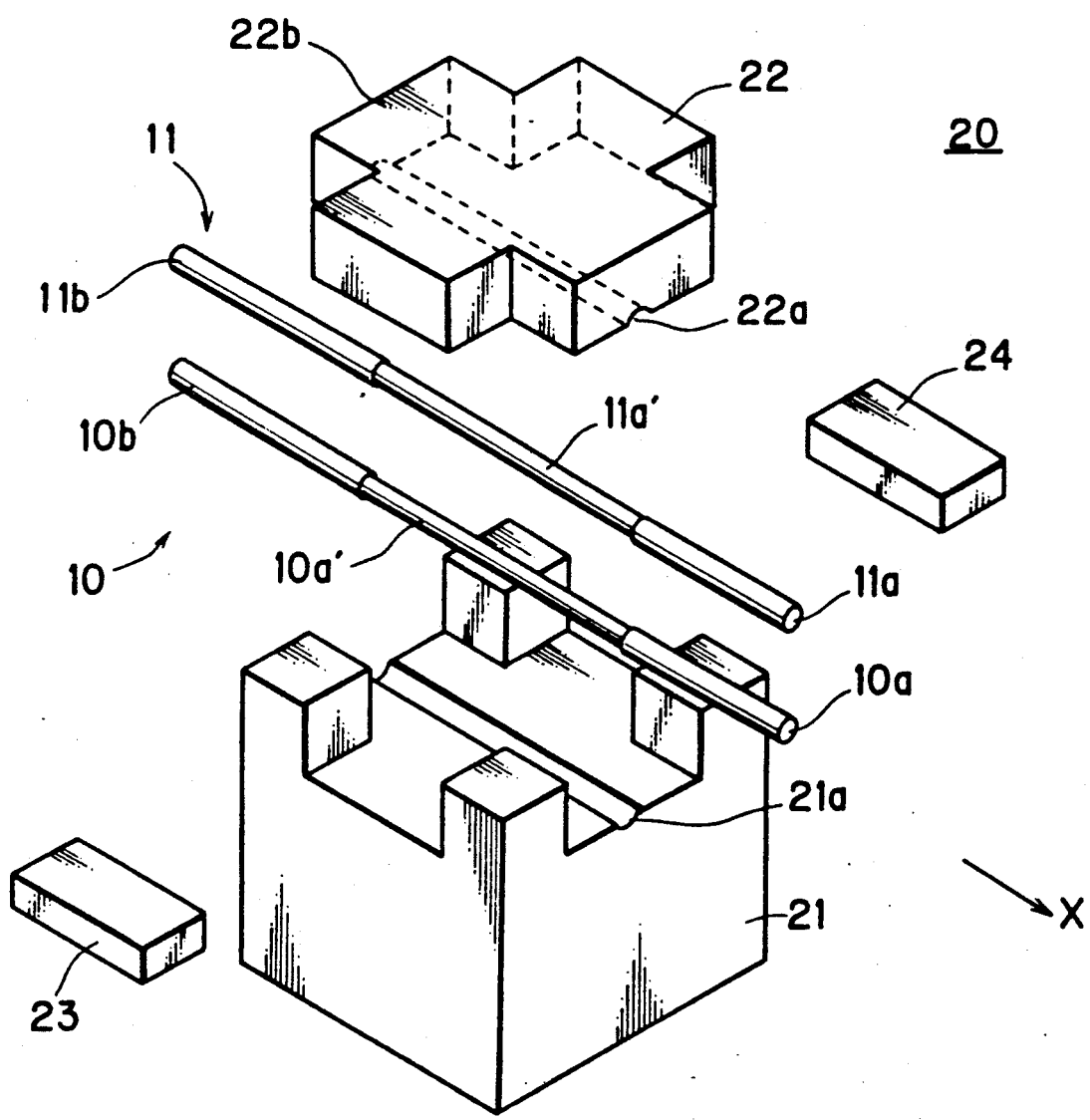
Figure 4:
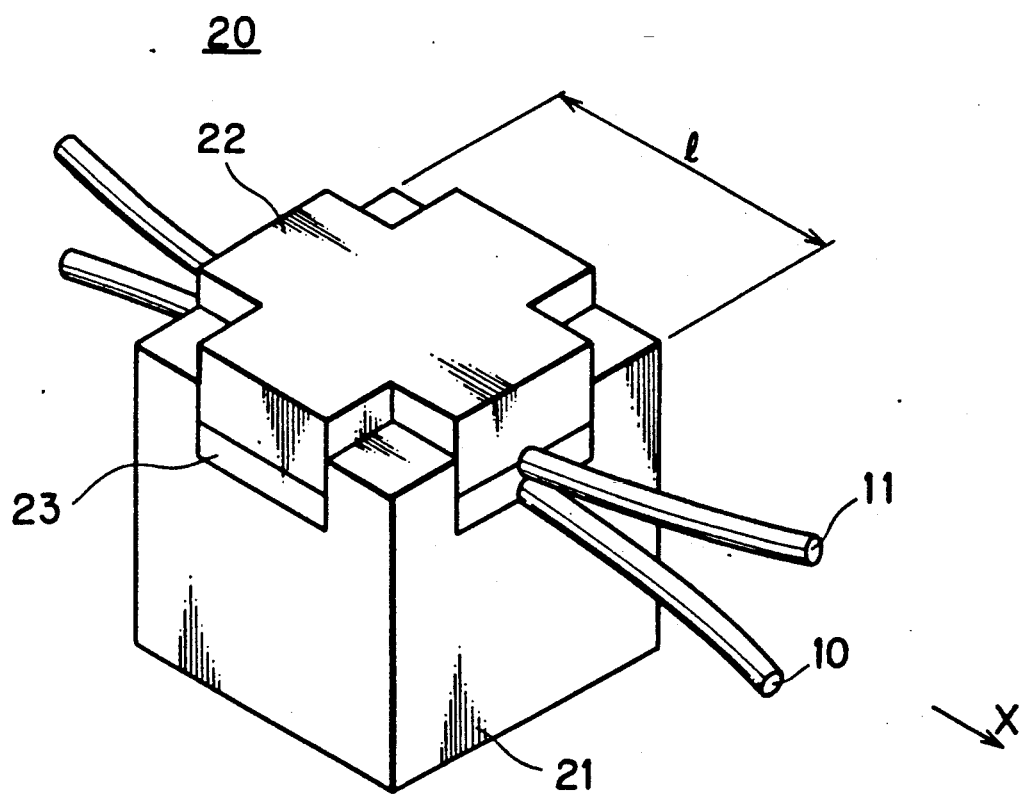

FIG. 2 is a view of an apparatus for manufacturing an optical coupler according to the present invention. The term "the apparatus" refers to the apparatus for manufacturing an optical coupler. FIGS. 3A, 3B and 4 are explanatory perspective views of the apparatus, respectively.

The apparatus includes a jig 20 for supporting two all plastic fibers 10 and 11, the all plastic fibers 10 and 11 being formed by cores 10a and 11a surrounded by clads 10b and 11b, respectively. The term "fiber" refers to the all plastic fiber. The jig 20 comprises a lower welding mold 21 and an upper welding mold 22, which are engageable with each other (FIGS. 3A or 3B). The lower and the upper mold 21 and 22 are made of metal or resin.

The lower welding mold 21 has a groove 21a on its upper surface, and the upper welding mold 22 has a groove 22a on its bottom surface, the grooves 21a and 22a extending in a direction X. First, the fibers 10 and 11 extending in the X-direction are placed in parallel juxtaposition to each other. Then, the upper welding mold 22 is moved upward while moving the welding mold 21 downward in such a manner that the fibers 10 and 11 are mounted in the grooves 21a and 22a, respectively. The fibers 10 and 11 are held in direct contact with each other in a predetermined position when the upper welding mold 22 engages with the lower welding mold 21.

The elements identified by the reference numbers 23 and 24 are spacers made of elastic material such as silicone rubber. The spacers 23 and 24 are inserted between the lower welding mold 22 and the upper welding mold 21 to prevent relative inclination of the lower and the upper welding mold 21 and 22 as well as dislocation of the fibers 10 and 11.

In addition, the apparatus is provided with an ultrasonic welding device 30 (FIG. 2). A vibrator 31 of the ultrasonic welding device 30 is connected to a top surface 22b of the upper welding mold 22. The vibrator 31 vibrates in a vertical direction during the ultrasonic welding device 30 is operating. The vibration energy of the vibrator 31 would be applied to a contacting segment of the fibers 10 and 11 through the upper welding mold 22.

The apparatus further includes a pressure application device (not shown) for applying specified pressure to the ultrasonic welding device 30 from an upper direction. When the pressure application device is activated, specified pressure is applied to the fiber 11 through the ultrasonic welding device 30 and the upper welding mold 22, whereby the fiber 11 is pressed against the fiber 10.

B. 2×2 Channeled Optical Coupler

B-1. First Embodiment

Now, explanation is given on the method of producing an optical coupler from two fibers made of non-crosslinked polymethyl methacrylate with the apparatus. First, an operator places fibers 10 and 11 in the predetermined positions (FIG. 3A) and gives a command through an operating panel not shown to start production. In response to this, the jig 20 holds the two fibers 10 and 11 in accordance with a instruction from a control part (not shown) which controls the whole apparatus.

Thereafter, the pressure application device is operated to apply specified pressure to the fiber 11 through the ultrasonic welding device 30 and the upper welding mold 22, so that the fiber 11 is pressed against the fiber 10. Next, the ultrasonic welding device 30 is operated, and the contacting segment of the fibers 10 and 11 receives vibration energy while being under predetermined pressure. Then, at initial stage of this, the clads 10b and 11b in the contacting segment are destroyed and pushed away in a direction Y perpendicular to the X-direction (FIG. 2), following which the cores 10a and 11a are partially fused together. This results in formation of a coupling segment 41 and four fiber branches 42 to 45 each of which extends therefrom longitudinally to the fibers 10 and 11.

On completion of the partial coupling of the cores 10a and 10b, the control part gives a stop command, to thereby stop the ultrasonic welding device 30 and the pressure application device and further to take out thus produced optical coupler 40A (FIG. 5) from the jig 20. As in FIG. 5, the optical coupler 40A has 2×2 channels; that is, the fiber branches 42 and 43 each of which is to serve as an input port (or an output port) and the fiber branches 44 and 45 each of which is to serve as an output port (or an input port).

Examplary measurement of an optical coupler produced in such manner will now be discussed. The optical coupler was produced under certain conditions. The conditions are as follows:

Pressure = 10 kgf;
Vibration Frequency = 15 kHz;
Vibration Amplitude = 40 μm;
Vibration Application Time = 0.5 sec.; and
Length of Coupling Segment 41 (i.e., l) = 20 mm.

An optical power measurement system was used for evaluation of the characterstics of the optical coupler 40A. The optical power measurement system includes a light source for outputting red light and a detector for measuring energy of light passing through an optical device. In the optical power measurement system, red light of 11.74 μW is received by the detector when one end of a clad-coated fiber, cut to the same length as the optical coupler 40A, is connected to the light source while other end thereof connected to the detector. More particularly, fiber branches 42 to 45 were individually connected to the light source of the optical power measurement system, the fiber branches 42 to 45 acting as a first to a fourth input or output port, respectively. Then, output values at fiber branches in the opposite side to the connected fiber branch were measured; for example, output values at the fiber branches 44 and 45 (the third and the fourth port) are measured when the fiber branch 42 (the first port) is connected to the light source. Thereafter, excess loss and divergence ratio were obtained from the measured values. Table 1 gives the results.

TABLE 1

| Output: | Input: | | | |
|---|---|---|---|---|
| | first port | second port | third port | fourth port |
| first port | — | — | 5.236 μW | 4.767 μW |
| second port | — | — | 4.037 μW | 5.020 μW |
| third port | 6.520 μW | 3.279 μW | — | — |
| fourth port | 3.048 μW | 6.446 μW | — | — |
| Loss (dB) | 0.89 | 0.82 | 1.03 | 0.79 |
| Divergence Ratio | 2.1:1.0 | 1.0:2.0 | 1.3:1.0 | 1.0:1.1 |

For example, when red light is given from a LED to the fourth port (fiber branch 45), the output values at the first port (fiber branch 42) and the second port (fiber branches 43) are 4.767 μW and 5.020 μW, respectively, and the divergence ratio of the optical coupler is 1.0:1.1. The excess loss EL is obtained as:

$$EL = -10 \cdot \log \frac{4.767 + 5.020}{11.74} = 0.79 \text{ (dB)}$$

Thus, an optical coupler 40A having low excess loss can be produced according to the production method of the present invention.

As described above, the following effects are obtainable according to the first embodiment:

(1) So-called ultrasonic welding is adopted in producing the optical coupler 40A according to the first embodiment, so that there is no thermal effect on the fibers 10 and 11 and hence no increase of excess loss due to shrinkage of the fibers 10 and 11 caused by heating. In fact, as in Table 1, an optical coupler 40A having low excess loss were successfully produced according to the first embodiment.

(2) There is no deformation of the fibers 10 and 11 caused by heat or diffusing clad material into the cores 10a and 11a, for the reasons being the same as above. Hence, the optical coupler 40A can be produced without deteriorating characteristics thereof.

(3) The optical coupler 40A offers simplicity and lower producing cost since no attempts are made to remove any of the clad prior to fusing the fibers 10 and 11.

(4) Time required for coupling fibers 10 and 11 is not more than 1 second (0.5 sec. in the first embodiment). Thus, the optical coupler 40A can be produced in a very short time.

B-2. Second Embodiment

The following description represents the method of producing an optical coupler from two polycarbonate fibers using the apparatus. First, clads 10b and 11b of fibers 10 and 11 are removed over a predetermined length, respectively. Removal of the clads is done by a chemical process using an etchant such as methyl methacrylate or by a mechanical process such as grinding. Thus, cores 10a and 11a of the fibers 10 and 11 are partially exposed, respectively. Such exposed portions will be hereinafter referred to as "the exposed core segments 10a' and 11a'" for the sake of convenience.

An operator places the fibers 10 and 11, which has gone through the clad removal, in the specified positions (FIG. 3B). Then, the operator instructs to start production through the operation panel (not illustrated), responding to this, a control part not shown for controlling the whole apparatus starts operating. Thus, a jig 20 holds the two fibers 10 and 11 according to a command from the control part.

Subsequently, a pressure application device is operated to apply predetermined pressure to the fiber 11 through an ultrasonic welding device 30 and the upper welding mold 22, to thereby press the exposed core segment 11a' into contact with the exposed core segment 10a'. Following this, the ultrasonic welding device 30 applies its vibration energy to the contacting segment of the exposed core segments 10a', 11b'. During this, the pressure application device keeps applying the predetermined pressure to the contacting segment. Thus, the exposed core segments 10a' and 11b' are fused together, whereby a coupling segment 41 and four fiber branches 42 to 45 are formed.

Figure 1:
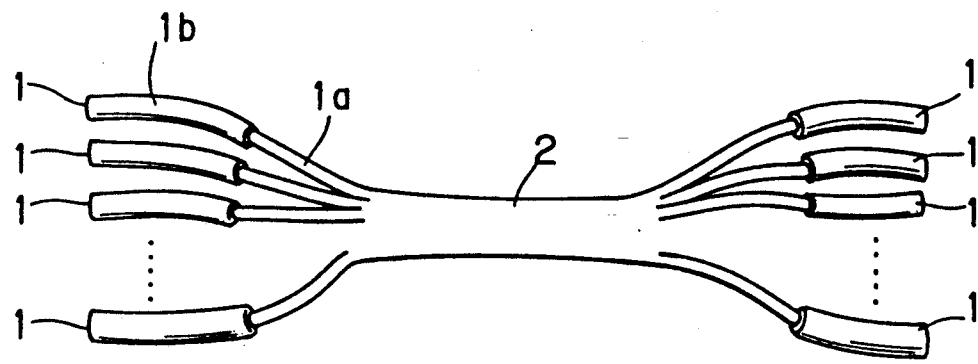
FIG. 1 is a view of a conventional optical coupler.
Figure 5:
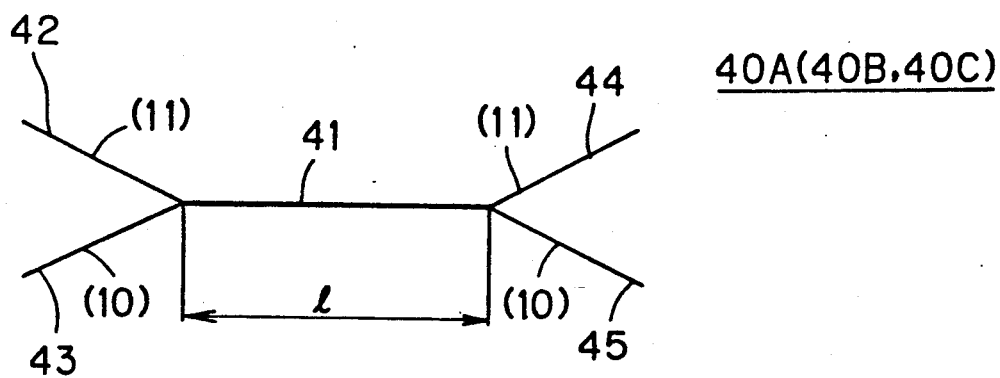
FIG. 5 is a schematic view of an optical coupler produced in accordance with the embodiments of the present invention.

On completion of the coupling of the exposed core segments 10a' and 11b', the control part operates the ultrasonic welding device 30 and the pressure application device to stop. Finally, an optical coupler 40B produced as above is taken out from the jig 20 (FIG. 5). As in FIG. 5, the optical coupler 40B is identical to the optical coupler 40A in structure.

Examplary measurement of an optical coupler 40B produced in the above manner will now be discussed. The optical coupler 40B was produced under specified conditions, the conditions being:

Length of Exposed Core Segment=20 mm;
Pressure=10 kgf;
Vibration Frequency=15 kHz;
Vibration Amplitude=40 μm;
Vibration Application Time=0.5 sec.; and
Length of Coupling Segment 41 (i.e., l)=20 mm.

The aforementioned optical power measurement system was used for evaluation of the characteristics. Precisely, a fiber branch 42 of the optical coupler 40B was connected to the light source of the optical power measurement system, the fiber branch 42 serving as a first input or output port. Then, light of a wavelength of 660 nm ($P_{42}=13$ μW) from a LED was entered to the fiber branch 42 acting as the first input port, and the output values $P_{44}$ and $P_{45}$ were measured, the values $P_{44}$ and $P_{45}$ being at the ends of the fiber branches 44 and 45, which serve as a third and a fourth output port, in the opposite side to the fiber branch 42 (the first input port), respectively. The output values $P_{44}$ and $P_{45}$ were 3.95 μW and 4.55 μW, respectively. Hence, the divergence ratio was 1.0:1.1, and the excess loss EL is:

$$EL = -10 \cdot \log \frac{3.95 + 4.55}{13.00} = 1.845 \text{ (dB)}$$

Further, light ($P_{43}=13$ μW) from the LED was inputted at the end of the fiber branch 43 (the second input port) to measure output values $P_{44}$ and $P_{45}$ at the ends of the fiber branches 44 and 45 (the third and the fourth output port), which are situated in the opposite side to the fiber branch 43 (the second input port). The output value $P_{44}$ was 3.73 μW and the value $P_{45}$ was 4.87 μW. Hence, the divergence ratio was 1.0:1.3, and the excess loss EL is:

$$EL = -10 \cdot \log \frac{3.73 + 4.87}{13.00} = 1.794 \text{ (dB)}$$

Thus, as can be seen from these results, an optical coupler 40B having low excess loss can be produced according to the production method of the present invention. In addition, the optical coupler 40B serves as an optical device having nearly equal distribution.

In the second embodiment, the fiber branches 42 and 43 act as an input port while the fiber branches 44 and 45 act as an output port. It must be noted here that the respective fiber branches 42 to 45 are an input port as well as an output port.

As described before, in the second embodiment, the optical coupler 40B is produced by the so-called ultrasonic welding, which accompanies no heating. Owing to absence of thermal effect, the fibers 10 and 11 do not shrink, and therefore, excess loss would not be deteriorated. This is the same as in the first embodiment. Thus, an optical coupler 40B having low excess loss can be produced according to the second embodiment. Further, the characteristics of the optical coupler 40B are not disgraced during the production. Still another advantage in producing the optical coupler 40B is largely reduced production time; that is, the time required for coupling the fibers 10 and 11 is not more than 1 second, to be precise, 0.5 second in the second embodiment.

Here, it is iterated that in the second embodiment the optical coupler 40B is formed by the fibers 10 and 11 made of polycarbonate plastic, which is generally known as so-called heat resistant fiber. This allows the optical coupler 40B to be enough use in rather high temperature, thus bringing about one more advantage in addition to those recited above.

B-3. Third Embodiment

In the following part, explanation is given on the method of producing an optical coupler from two fibers of crosslinked polymethyl methacrylate with the apparatus. Substantially the same as the second embodiment, the production method will not be explained in detail here.

Examplary measurements of three optical couplers 40C produced in a similar manner as the second embodiment will now be discussed. The respective optical couplers 40C were produced under the following conditions:
Length of Exposed Core Segment=20 mm;
Pressure=10 kgf;
Vibration Frequency=15 kHz;
Vibration Amplitude=40 μm;
Vibration Application time=0.5 sec.; and
Length of Coupling Segment 41 (i.e., l)=20 mm.

The aforementioned optical power measuring system was used for evaluation of the characteristics of the optical couplers 40C. Precisely, a fiber branch 42 of each of the optical couplers 40C was individually connected to the light source of the optical power measurement system. Then, red light (=17 μW) from a LED is injected into the fiber branch 42 in order to measure output values at the ends of the fiber branches 44 and 45, which are in the opposite side to the fiber branch 42. Further, a fiber branch 43 of each of the optical couplers 40C was in turn connected to the light source. Then, output values at the ends of the fiber branches 44 and 45 were measured, similualy to the above. Then, the excess loss EL and the divergence ratio were calculated. Tables 2 to 4 show the results with respect to the three optical couplers 40C.

TABLE 2

| Output: | Input: | |
|---|---|---|
| | first port | second port |
| third port | 3.06 μW | 7.29 μW |
| fourth port | 7.35 μW | 3.31 μW |
| Loss | 2.13 dB | 2.05 dB |
| Divergence Ratio | 1:2.4 | 1:2.2 |

TABLE 3

| Output: | Input: | |
|---|---|---|
| | first port | second port |
| third port | 3.21 μW | 6.72 μW |
| fourth port | 6.09 μW | 3.36 μW |
| Loss | 2.62 dB | 2.27 dB |
| Divergence Ratio | 1:1.9 | 1:2.0 |

TABLE 4

| Output: | Input: | |
|---|---|---|
| | first port | second port |
| third port | 3.78 μW | 5.38 μW |
| fourth port | 4.92 μW | 3.58 μW |
| Loss | 2.91 dB | 2.78 dB |
| Divergence Ratio | 1:1.3 | 1:1.5 |

Referring to the tables 2 to 4, the first to the fourth ports indicate the fiber branches 42 to 45 acting as an input or an output port, respectively.

As can be seen from the tables, an optical coupler 40C having low loss can be attained according to the production method embodied by the third embodiment.

Thus, effects similar to that of the second embodiment are obtainable in the third embodiment.

B-4. Fourth Embodiment

In the first to the third embodiments, two fibers 10 and 11, each of which comprises a core and a clad surrounding the core, were fused together by a predetermined length, whereby the respective optical couplers 40A, 40B and 40C are produced. However, this is not exclusive or limiting. It is also possible to produce an optical coupler from fibers which are not covered with a clad. Description below is examplary production method using non-clad fibers.

First, a mixed monomer is made by using benzoyl peroxide as an initiator, methyl methacrylate as a preform, and ethylene glycol dimethacrylate (=concentration of 1.0 weight percent) as a crosslinked agent. The mixed monomer is then sealed in a Teflon tube having an inner diameter of 1.0 mm. Thereafter, the monomer in the Telfon tube is polymerized under heat in a deoxidized atmosphere. Thus, a thermosetting resin fiber is obtained, which includes nothing but a core. Remaining steps of production method are similar to the first embodiment: First, two fibers thus produced are prepared; Next, predetermined pressure is applied to the fibers in order to press them with each other over a predetermined length; Then, ultrasonic vibration is applied to the contacting segment of the fibers; whereby the cores of the fibers are fused together in the contacting segment. This results in formation of a coupling segment and four fiber branches. Consequently, a 2×2 channeled optical coupler is produced. The coupling segment and the outer periphery of the cores are coated with a resin having low refractive index, e.g., prepolymer, in order to prevent leakage of light from the fibers.

Having examined in a manner similar to described before, an optical coupler produced as above exhibited results of about 3dB excess loss and about 1.0:1.5 divergence ratio. Hence, a quality optical coupler having small excess loss is obtainable.

B-5. Other Embodiment

Further, the divergence ratio can be changed properly by adjusting the pressure applying to the contacting segment of the fibers. For example, when an optical coupler 40A is produced according to the production method above while varying pressure within the range of 5 kgf to 10 kgf (other conditions are the same as above), the divergence ratio can vary in the range of 8:1 to 1:1.

C. 1×N Channeled Optical Coupler

Figure 6:
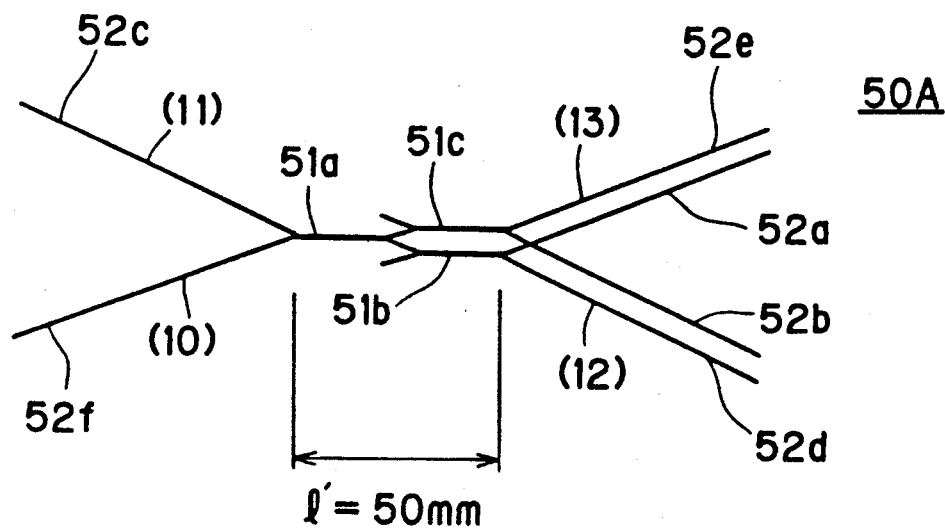
FIG. 6 is a schematic view of an optical coupler according to a fifth embodiment of the present invention.
Figure 7A:
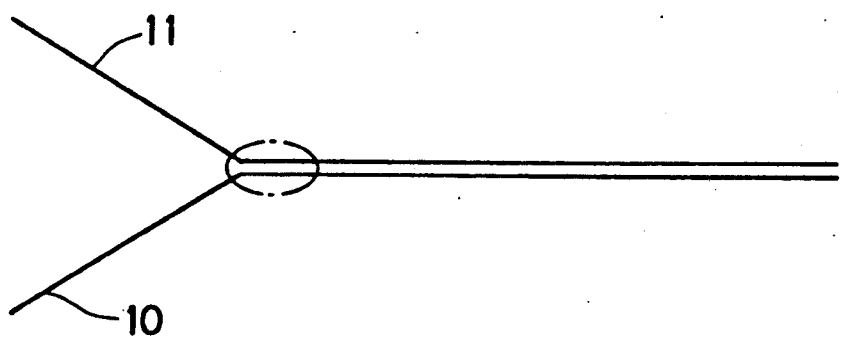
FIGS. 7A to 7C are schematic views showing the manufacturing procedure for the optical coupler of FIG. 6, respectively.

FIG. 6 is a schematic view of an optical coupler 50A according to a fifth embodiment of the present invention. The optical coupler 50A is produced by ultrasonic welding. Production of the optical coupler 50A is as follows: As in FIG. 7A, first, fibers 10 and 11 are placed in partial juxtaposition to each other and in contact with each other. Before proceeding to further explanation, one thing must be made clear; that is, the fibers 10 and 11 are illustrated as being separated in FIG. 7A only for clearity of the positional relations therebetween. The fibers 10 and 11 are contacting with each other in contacting segment thereof (i.e., portion encircled by dashed-and-dotted line).

Figure 7B:
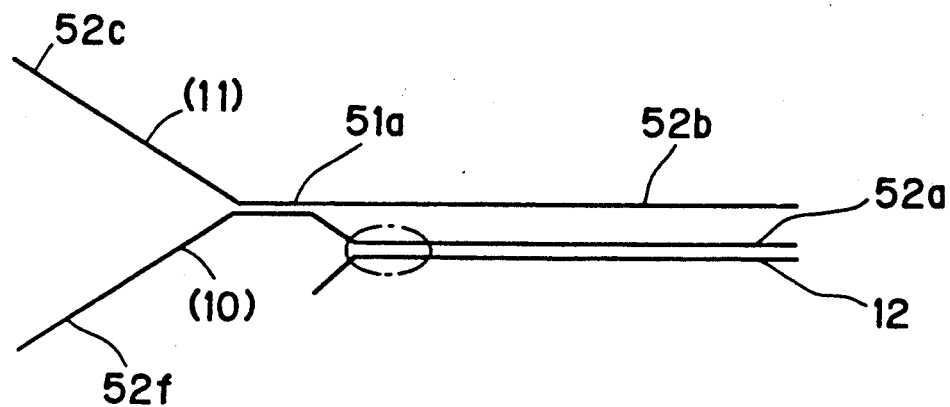

Now turning back to the explanation, the fibers 10 and 11 are then fused together by ultrasonic welding in the contacting segment, whereby a coupling segment 51a and two fiber branches 52a and 52b, each of which extends from the coupling segment 51a, are formed (FIG. 7B).

Figure 7C:
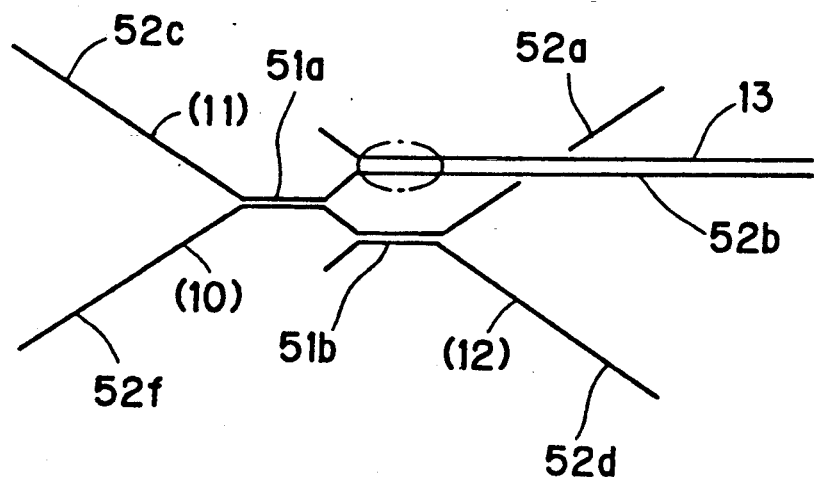

Next, a fiber 12 is placed approximately in parallel to the fiber branch 52a extending from the coupling segment 51a. Thereafter, the fiber branch 52a and the fiber 12 are partially fused together by ultrasonic welding (i.e., portion encircled by dashed-and-dotted line in FIG. 7B), whereby a coupling segment 51b and two fiber branches 52a and 52d extending from the coupling segment 51b are formed (FIG. 7C). Likewise, a fiber 13 is then placed approximately in parallel to the fiber branch 52b, followed by partial fusing together (portion encircled by dashed-and-dotted line in FIG. 7C) by ultrasonic welding, in order to form a coupling segment 51c (FIG. 6) and two fiber branches 52b and 52e extending from the coupling segment 51c. Thus, the optical coupler 50A is produced.

Hence, an optical signal injected into the fiber branch 52c serving as an input or an output port is divided into two at the coupling segment 51a to be guided to the coupling segments 51b and 51c. The optical signal guided to the coupling segment 51b is then further divided into two signals to be outputted at the fiber branches 52a and 52d serving as an input or an output port. Another optical signal guided to the coupling segment 51c is likewise divided into two signals thereat, to be outputted at the fiber branches 52b and 52e serving as an input or an output port. Thus, the optical coupler 50A is capable of transmitting one optical signal to four nodes (fiber branches) at one time. In other words, the optical coupler 50A acts as a 1×4 channeled optical coupler.

It is iterated that the divergence ratios of the coupling segments 51a to 51c can be changed by adjusting pressure to be applied onto the fibers during ultrasonic welding. Hence, by properly setting divergence ratios of the coupling segments 51a to 51c, a desired distribution of optical signal energy is available at the ends of the fiber branches 52a, 52b, 52d and 52e.

In addition, the optical coupler 50A is capable of coupling optical signals injected into fiber braches 52a, 52b, 52d and 52e at coupling segments 51a, 51b and 51c. The optical signals coupled at the coupling segments would be then divided and discharged from fiber the branches 52c and 52f.

Examplary measurement of an optical coupler 50A will now be discussed. Production of the optical coupler 50A of FIG. 6 is carried out as follows: First, the coupling segment 51a was produced by ultrasonic welding as above. The conditions employed in the ultrasonic welding are
Pressure=10 kgf,
Vibration Frequency=15 kHz,
Vibration Amplitude=40 μm,
Vibration Application Time=0.5 sec., and
Length of Coupling Segment 51a (i.e., $l_a$)=20 mm.

Following the production of the coupling segment 51a, ultrasonic welding is then applied to portions 10 mm away from the coupling segment 51a under the same conditions, to thereby form coupling segments 51b and 51c. Consequently, the optical coupler 50A is produced eventually.

Then, the characteristics of the optical coupler 50A are examined with an optical power measurement system as above. More particularly, the end of the fiber branch 52c is connected to the light source of the optical power measurement system. Thereafter, light ($P_{52c}=16$ μW) from the light source is injected into the fiber branch 52c, thereby to measure output values $P_{52a}$, $P_{52b}$, $P_{52d}$ and $P_{52e}$ at the ends of the fiber branches 52a, 52b, 52d and 52e. The output values $P_{52a}$, $P_{52b}$, $P_{52d}$ and $P_{52e}$ were 1.5 μW, 1.7 μW, 1.5 μW and 1.3 μW, respectively. Thus, it is observed that the inputted optical signal was distributed approximately equally. The excess loss EL is obtained as:

$$EL = -10 \cdot \log \frac{1.5 + 1.7 + 1.5 + 1.3}{16} = 4.25 \text{ (dB)}$$

In the fifth embodiment, one optical signal can be distributed to four fiber branches, i.e., distribution number N is "4." The distribution number N can be changed depending on the number of coupling segments. For instance, if the coupling segment 51c is not produced in the above embodiment, the distribution number N would be "3." In this case, an optical signal entered at the fiber branch 52c would be expelled at the ends of the fiber branches 52a, 52b and 52d with a proper distribution ratio. If, on the other hand, the number of coupling segments is increased, the distribution number N would grow by the increased number of the coupling segments. More particularly, a plurality of fibers are placed in branching off relations. Then, ultrasonic welding is applied to each contacting portion in which a downstream portion of a fiber in the upstream side with respect to the contacting portion is placed in parallel and in contact with an upstream portion of a fiber in the downstream side with respect to the contacting portion.

Figure 8:
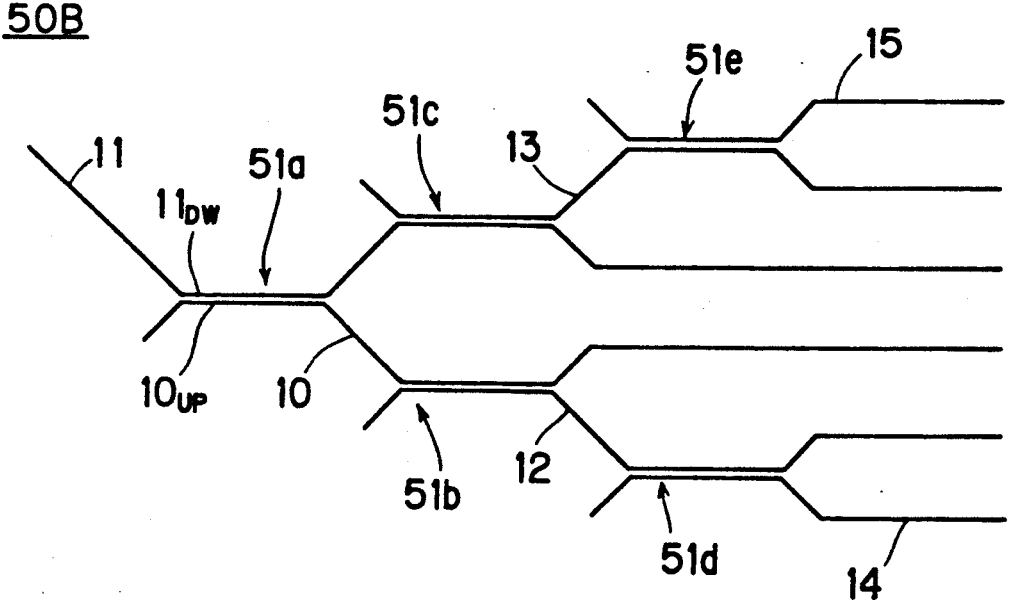
FIG. 8 is a schematic view of an optical coupler with the distribution number N of "6"

FIG. 8 is a schematic view of an optical coupler 50B with the distribution number N of "6". In producing the optical coupler 50B, six fibers 10 to 15 are prepared, and are then arranged as in FIG. 8 wherein the fibers are gradually branching off from the upstream side (left-hand side of the figure) toward the downstream side (right-hand side of the figure). At the first contacting segment 51a, the downstream portion $11_{DW}$ of the fiber 11 and the upstream portion $10_{UP}$ of the fiber 10 are then fused together by ultrasonic welding in a manner as above. Here, brief explanation is given on the terms "upstream side" and "downstream side." These terms are used for describing the relative positional relation between fibers which face each other. In FIG. 8, according to this terminology, the fiber 11 is placed in the upstream side while the fiber 10 being placed in the downstream side such that they are in contact with each other over a predetermined portion. The facing portions $11_{DW}$ and $10_{UP}$ of the fibers 11 and 10 are referred to as "downstream portion" and "upstream portion," respectively, for the purpose of clear distinction. The terms will adhere to the remaining explanations of the specification.

After the welding of the first contacting segment 51a, two fibers are fused together by ultrasonic welding individually at the second to the fifth contacting segment 51b to 51e. Therefore, one fiber branch is formed in the upstream side (left-hand side of the figure) while six fiber branches being formed in the downstream side (right-hand side of the figure), the fiber branches serving as an onput or an output port. Consequently, a 1×6 channeled optical coupler 50B is produced and similar effects to described before can be attained.

Figure 9:
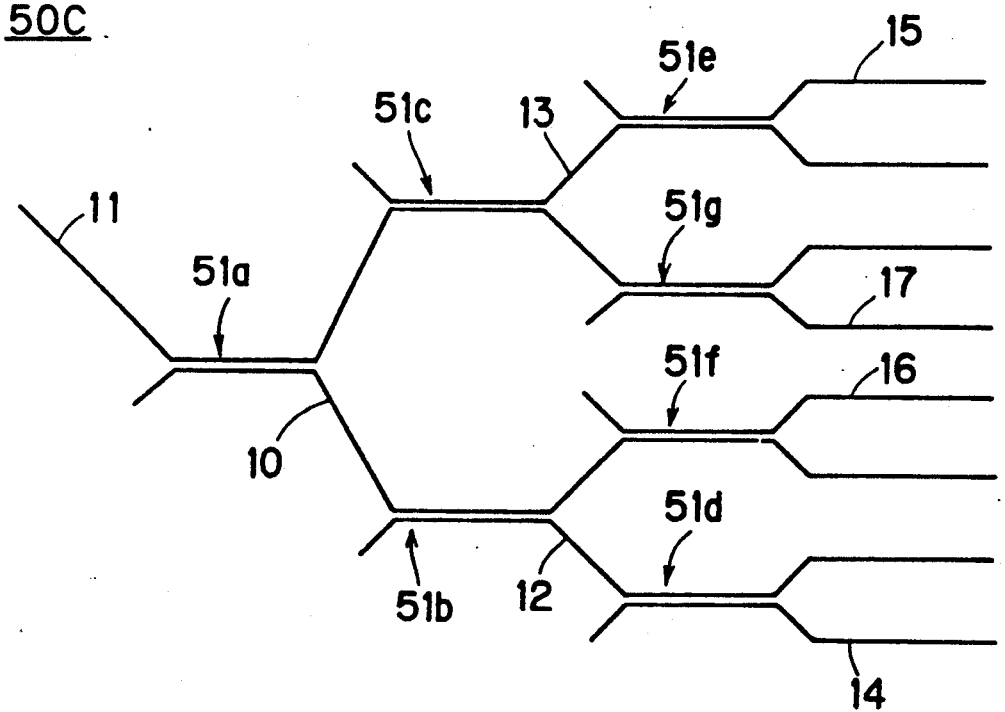
FIG. 9 is a schematic view of an optical coupler with the distribution number N of "8"

FIG. 9 is a schematic view of an optical coupler 50C with the distribution number N of "8." In FIG. 9, eight fibers 10 to 17 are placed in branching off relations such that they gradually diverge from the upstream side (left-hand side of the figure) toward the downstream side (right-hand side of the figure). At each one of the contacting segments 51a to 51e, downstream portion of the fiber in the upstream side and upstream portion of the fiber in the downstream side are fused together by ultrasonic welding similarly as described above. In consequence, an optical coupler 50C in which the distribution number N is 8 and similar effects to described before can be attained.

D. M×N Channeled Optical Coupler

Figure 10:
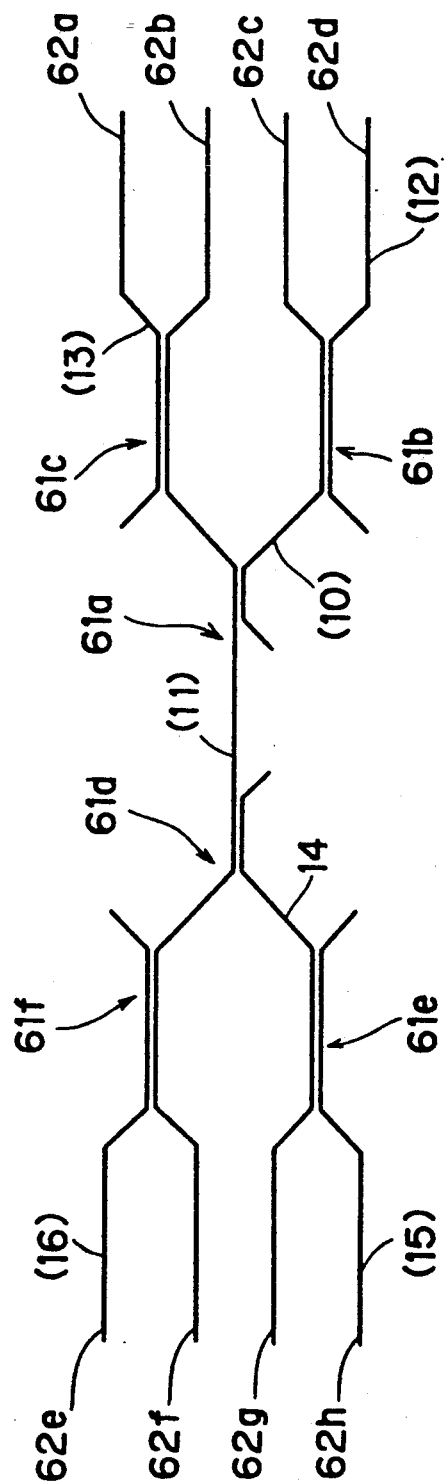
FIGS. 10 and 11 are schematic views of optical couplers according to a sixth embodiment of the present invention, respectively.

FIG. 10 is a schematic view of an optical coupler 60 according to a sixth embodiment of the present invention. The optical coupler 60A is produced as follow: First, four fibers 10 to 13 are prepared, and are then disposed as in FIG. 10, similarly to the fifth embodiment. Thereafter, two fibers are fused together by ultrasonic welding individually at a first to a third contacting segment 61a to 61c. Thus, an optical coupler having four fiber branches 62a to 62d in the downstream side is produced, which is identical to the optical coupler 50A of FIG. 6. Following this, three fibers 14 to 16 are further prepared, and are then arranged as in FIG. 10 wherein the three fibers 14 to 16 are gradually branching off from the upper portion of the fiber 11 toward the upstream side (left-hand side of the figure). Then, at each of contacting segments 61d to 61f, two fibers are fused together by ultrasonic welding, whereby four fiber branches 62e to 62h are formed in the upstream side. Consequently, an optical coupler 60A is produced, which has four fiber branches serving as an input port and four fiber branches serving as an output port.

Figure 11:
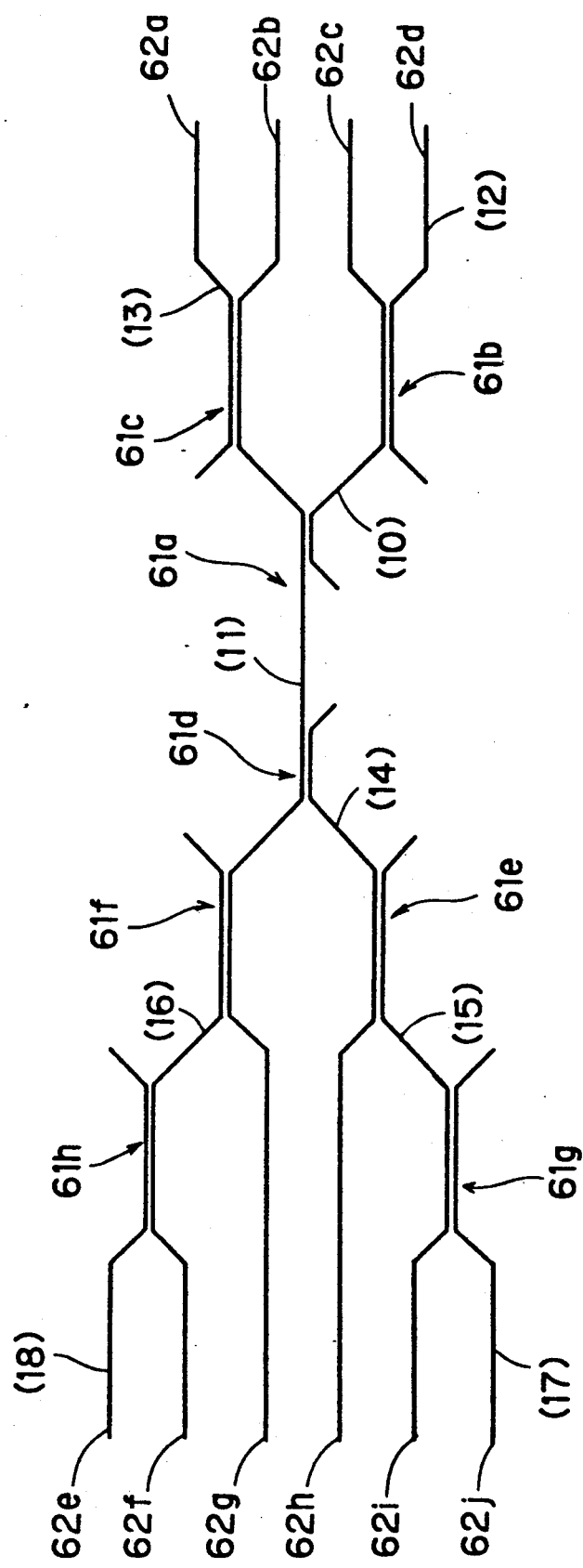

Although the above embodiment describes the 4×4 channeled optical coupler 60A in which the number M of input ports is "4" and the number N of output ports is "4", the numbers M and N can be changed depending on the number of coupling segments. For instance, after an optical coupler having four fiber branches 62a to 62d in the downstream side is produced, five fiber 14 to 18 are arranged as in FIG. 11 wherein the fibers 14 to 18 are gradually branching off from the upper portion of the fiber 11 toward the upstream side (left-hand side of the figure). Then, at each of contacting segments 61d to 61h, two fibers are fused together by ultrasonic welding, whereby six fiber branches 62e to 62j are formed in the upstream side. Consequently, an optical coupler 60B is produced, in which the number M is "6".

E. $2^m \times 2^m$ Channeled Optical Coupler

E-1. Seventh Embodiment

Figure 12A:
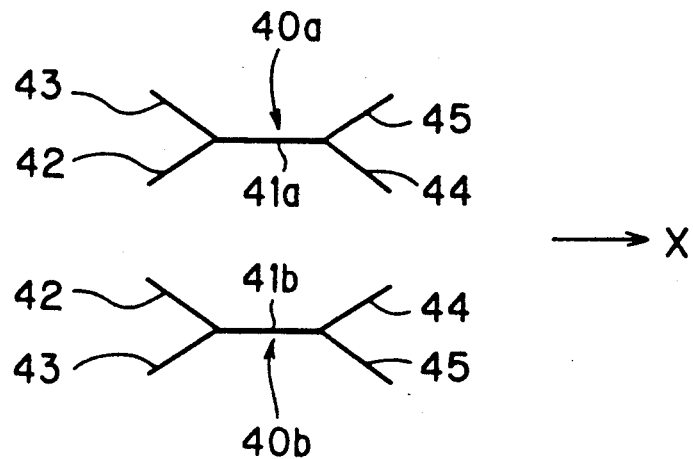
FIGS. 12A to 12 C are schematic views showing the manufacturing procedure for an optical coupler according to a seventh embodiment of the present invention, respectively.
Figure 12B:
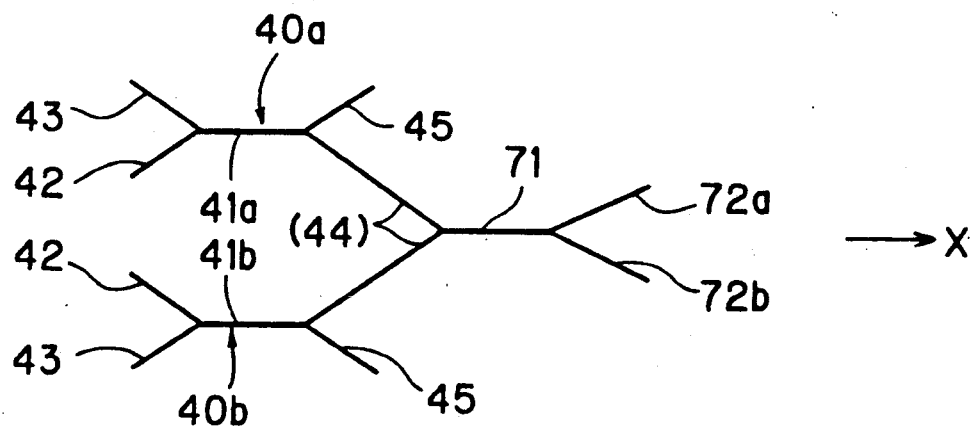
Figure 12C:
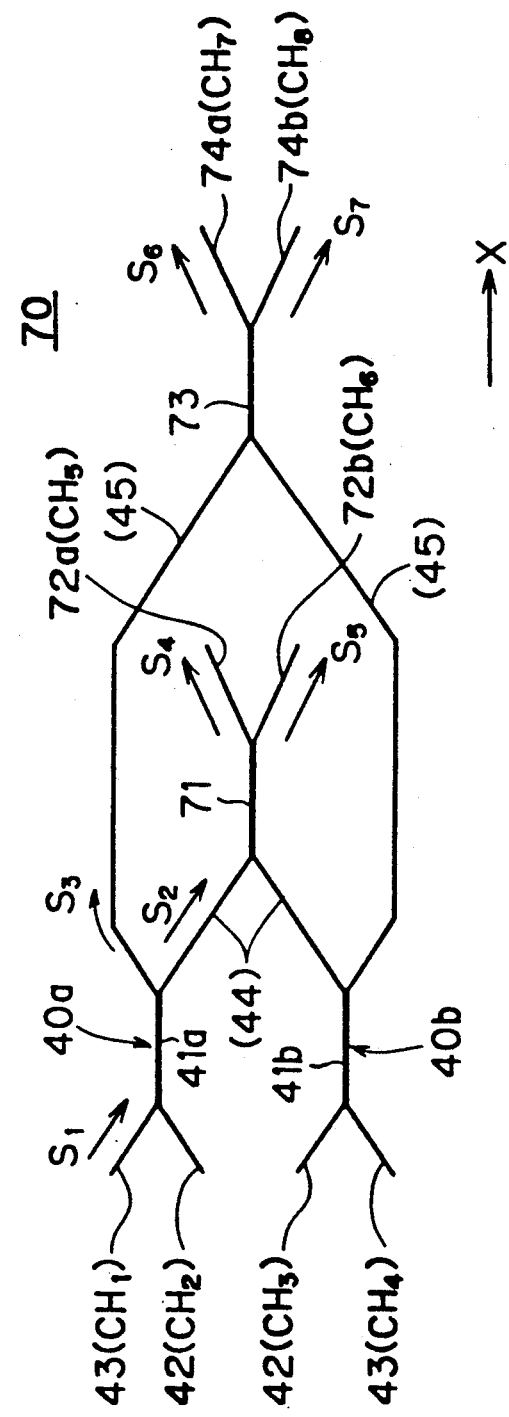

FIG. 12C is a schematic view of an optical coupler 70 according to a seventh embodiment of the present invention. In producing the optical coupler 70, first, 2×2 channeled optical couplers 40a and 40b produced as above are prepared and placed in parallel (FIG. 12A). Then, middle portions of the fiber branches 44 are fused together by ultrasonic welding (FIG. 12B). This results in formation of the coupling segment 71 and the fiber branches 72a, 72b which extend therefrom longitudinally to the fibers, that is, in the X-direction. Likewise, middle portions of the fiber branches 45 are fused together (FIG. 12C), whereby the coupling segment 73 and the fiber branches 74a, 74b are formed. Thus, the optical coupler 70 is produced which has $2^2 \times 2^2$ channels; that is, $2^2$ fiber branches 42, 43, 42 and 43 which are to serve as an input port and $2^2$ fiber branches 72a, 72b, 74a and 74b which are to serve as an output port. It is needless to say that the fiber branches 42, 43, 42 and 43 can be used as an output port while using the fiber branches 72a, 72b, 74a and 74b as an input port.

E-2. Eighth Embodiment

Figure 13A:
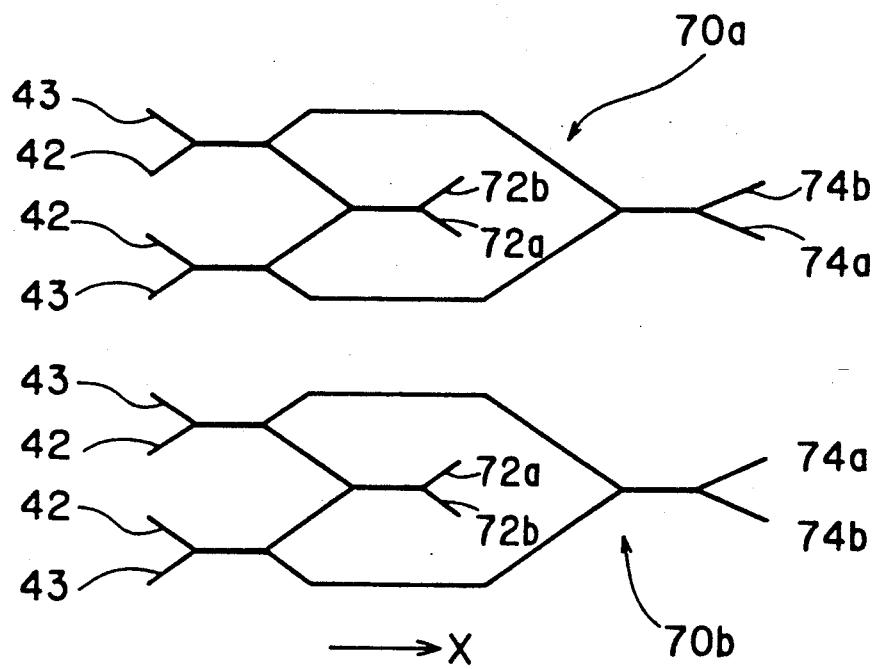
FIGS. 13A to 13C are schematic views showing the manufacturing procedure for an optical coupler according to an eighth embodiment of the present invention, respectively.
Figure 13B:
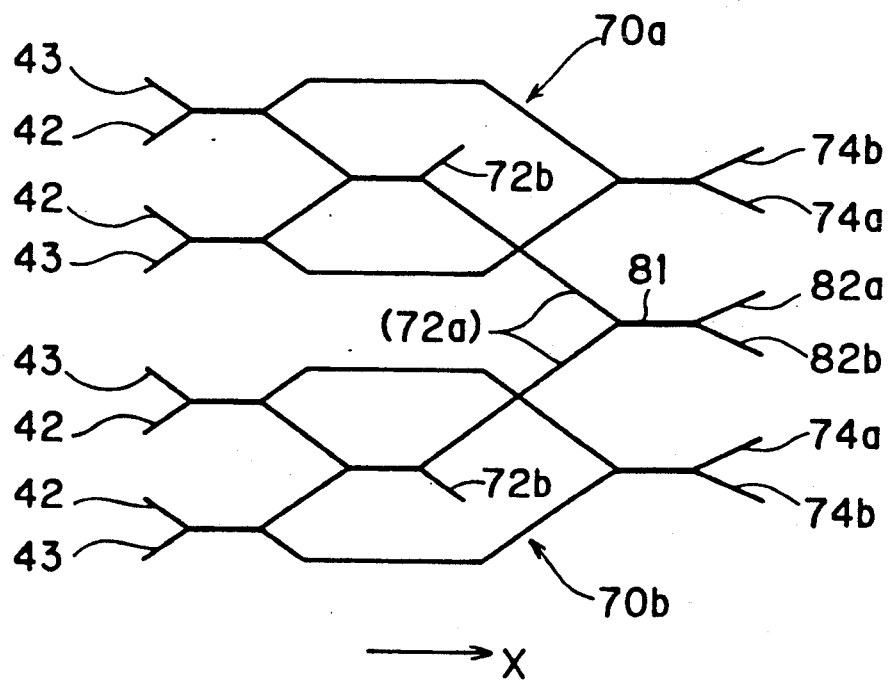
Figure 13C:
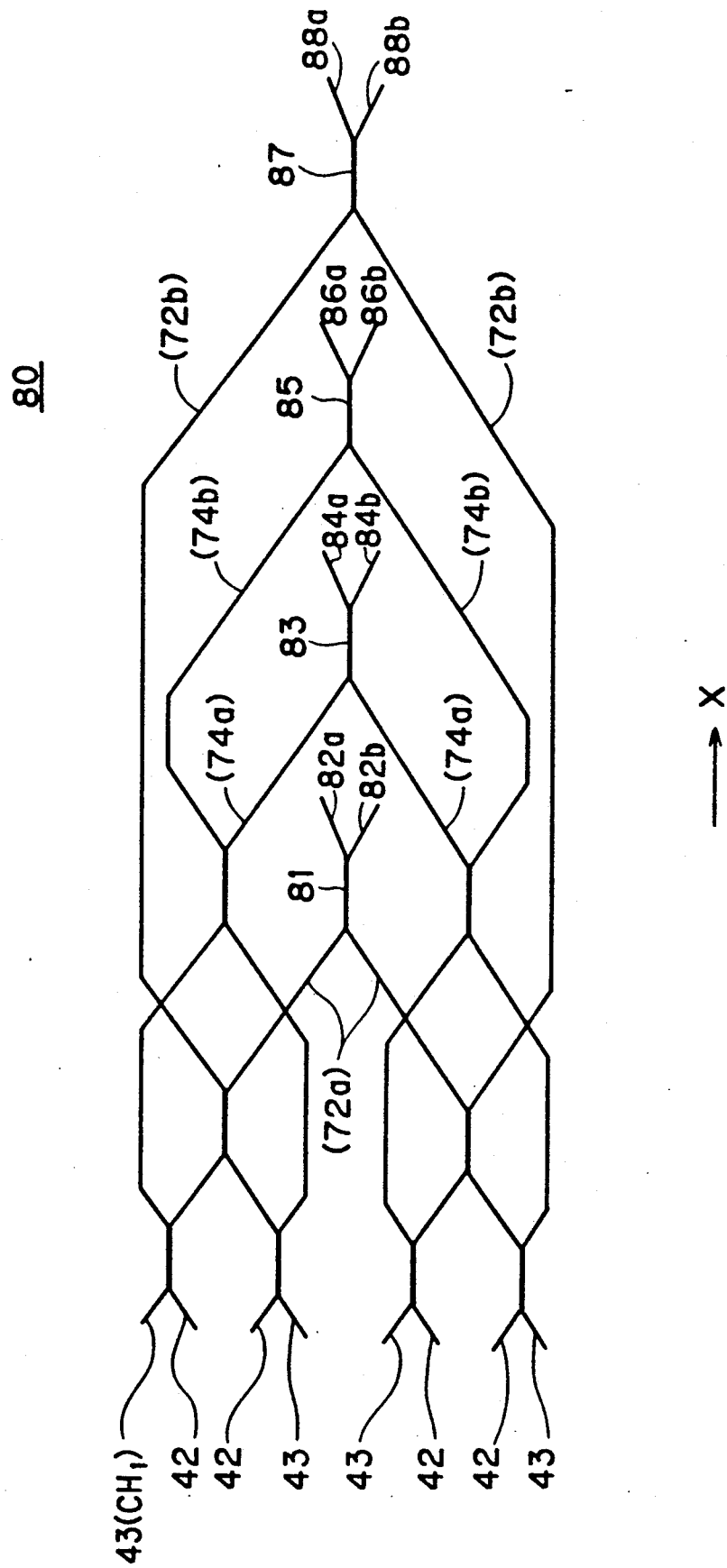

FIG. 13C is a schematic view of an optical coupler 80 according to an eight embodiment of the present invention. In producing the optical coupler 70, first, $2^2 \times 2^2$ channel optical couplers 70a and 70b produced as above are prepared. The optical couplers 70a and 70b are then placed in parallel (FIG. 13A). Thereafter, middle portions of the fiber branches 73a are fused together by ultrasonic welding (FIG. 13B). This results in formation of coupling segment 81 and fiber branches 82a, 82b each of which extends therefrom in the X-direction. Likewise, middle portions of the fiber branches 74a, the fiber branches 74b and the fiber branches 72b are individually fused together (FIG. 13C), whereby coupling segments 83, 85, 87 of FIG. 13C are formed, respectively. Thus, the optical coupler 80 is produced which has $2^3 \times 2^3$ channels; that is, $2^3$ fiber branches 42, 43, . . . which are to be either an input or an output port and $2^3$ fiber branches 82a, 82b, . . . which are to be either an output or an input port.

E-3. Ninth Embodiment

Figure 14A:
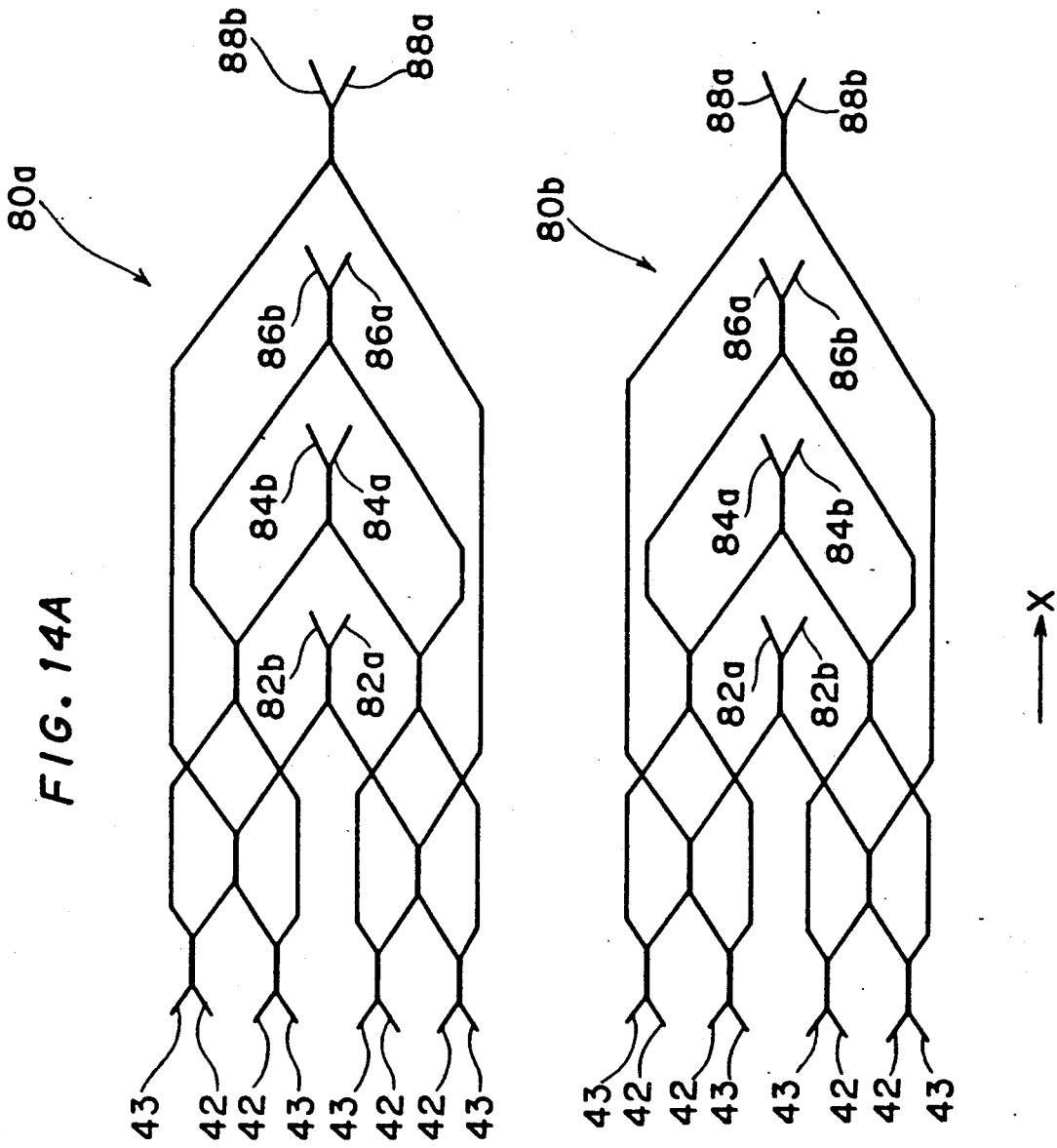
Figure 14C:
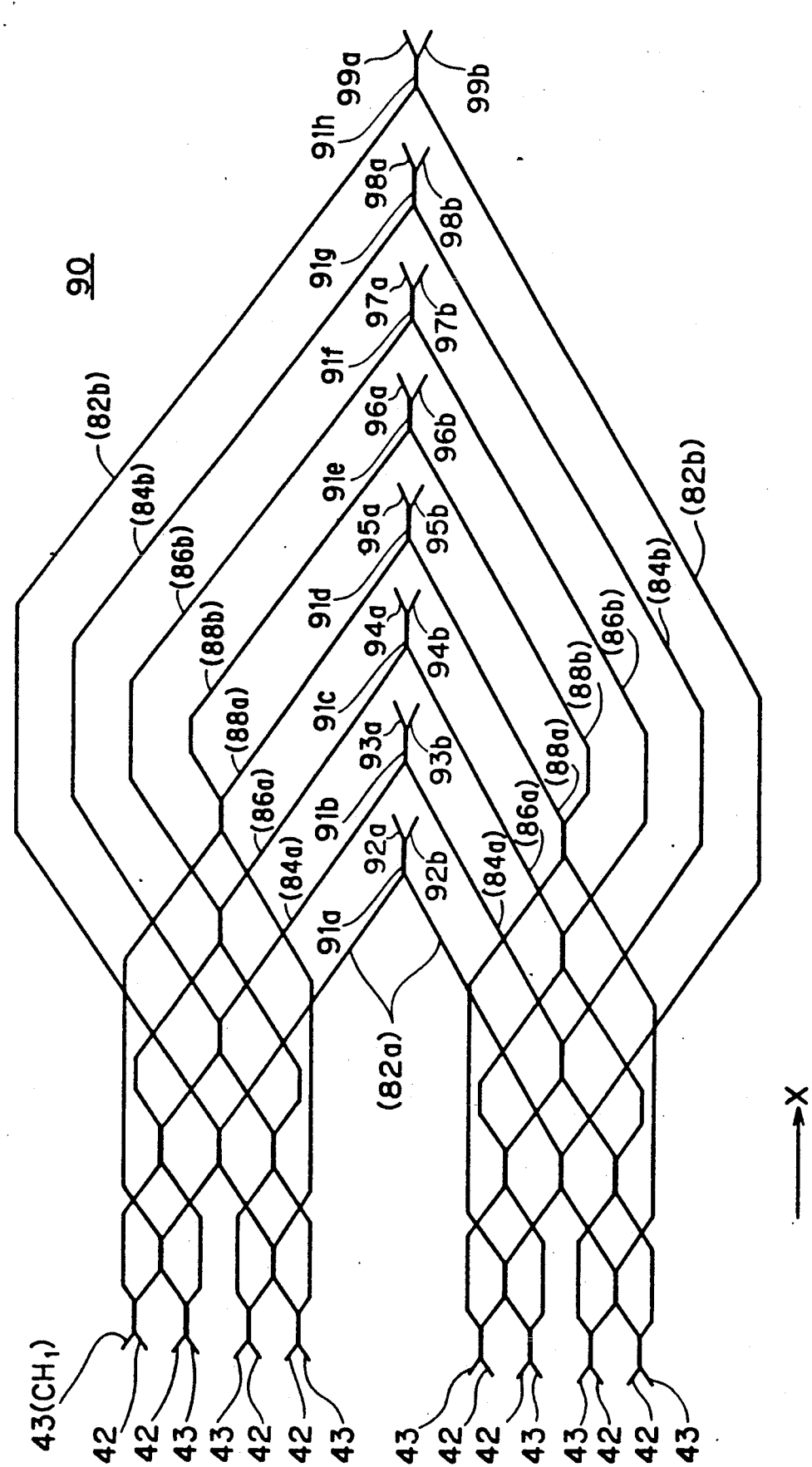

FIG. 14C is a schematic view of an optical coupler 90 according to a ninth embodiment of the present invention. In producing the optical coupler 90, first, $2^3 \times 2^3$ channeled optical couplers 80a, 80b produced as above are prepared. The optical couplers 80a, 80b are then placed in parallel (FIG. 14A). Thereafter, middle portions of the fiber branches 83a are fused together by ultrasonic welding (FIG. 14B). This results in formation of coupling segment 91a and fiber branches 92a, 92b each of which extends therefrom longitudinally to the fibers, that is, in the X-direction. Likewise, fiber branches corresponding to each other are fused together at middle portions thereof, whereby coupling segments 91b to 91h of FIG. 14C are formed, respectively. Thus, the optical coupler 90 is produced which has $2^4 \times 2^4$ channels; that is, $2^4$ fiber branches 42, 43, . . . which are to be either an input or an output port and $2^4$ fiber branches 92a, 92b, . . . which are to be either an output or an input port.

E-4. Other Embodiment

The seventh to the ninth embodiments are focused on $2^2 \times 2^2$, $2^3 \times 2^3$, $2^4 \times 2^4$ channeled optical couplers. However, application of the present invention is not limited to this, but rather other applications are also available: For example, two optical couplers each having $2^n \times 2^n$ channels are prepared, similarly to the seventh to the ninth embodiments. Each optical coupler has $2^n$ ($n \geq 4$) input fiber branches to be an input port and $2^n$ output fiber branches to be an output port. Then welding is conducted to couple middle portions of the output fiber branches of one optical coupler and the middle portions corresponding thereto of the other optical coupler. Thus, a optical coupler which has $2^{n+1} \times 2^{n+1}$ channels is produced.

E-5. Operations of Seventh Embodiment

FIG. 12C also shows the operation of the optical coupler 70 according to the seventh embodiment. The optical coupler 70, a $2^2 \times 2^2$ channeled type coupler, has four fiber branches 42, 43, 42 and 43 to serve as an input port (or output port) and another four fiber branches 72a, 72b, 74a, 74b to serve as an output port (or input port). In the following description, the fiber branches will be termed as follows for clarity of explanation: The fiber branches 42, 43, 42 and 43 will be referred to, from the top in the figure, as the first port $CH_1$, the second port $CH_2$, the third port $CH_3$ and the fourth port $CH_4$, while the fiber branches 72a, 72b, 74a, 74b will be referred to, from the top in the figure, as the fifth port $CH_5$, the sixth port $CH_6$, the seventh port $CH_7$ and the eighth port $CH_8$.

In FIG. 12C, an optical signal $S_1$ inputted at the first port $CH_1$ is guided to the coupling segment 41a where it would be divided into optical signals $S_2$ and $S_3$.

The optical signal $S_2$ is then guided to the coupling segment 71 where it would be divided into optical signals $S_4$ and $S_5$ to be eventually outputted at the fifth and the sixth ports $CH_5$ and $CH_6$. The optical signal $S_3$, on the other hand, is guided to the coupling segment 73 where it would be divided into optical signals $S_6$ and $S_7$ to be similarly outputted at the seventh and the eighth ports $CH_7$ and $CH_8$.

The energies of the optical signals $S_2$ to $S_7$ vary depending on the divergence characteristics of the coupling segments, however, information contained therein are exactly the same with that of the optical signal $S_1$. Hence, in the optical coupler 70, energies of optical signals outputted at the ports $CH_5$ to $CH_8$ can be distributed as desired as a matter of course, but also can be approximately equaled to each other, by properly setting the divergence characteristics of the coupling segments 41a, 41b, 71 and 73. The divergence characteristics of the coupling segments can be changed by adjusting lengths of the coupling segments or pressure applied during welding.

The optical coupler 70 performs similar operations to above even when an optical signal is inputted to any port other than the first port $CH_1$. The input optical signal is divided and outputted, at four ports in the opposite side to the port which received the input signal, in the form of four optical signals each containing the information of the input optical signal.

Being easy to be assumed from the operations of the optical coupler 70, the operations of the optical couplers 80 and 90 are not particularly explained here.

E-6. Examples of Seventh to Ninth Embodiments

Examplary measurements of optical couplers 70, 80 and 90, each of which comprises a plurality of fibers of non-crosslinked polymethyl methacrylate, will now be discussed.

An optical coupler 70 was produced by forming coupling segments 41a, 41b, 71 and 73 by ultrasonic welding under the following conditions:
Pressure = 10 kgf;
Vibration Frequency = 15 kHz;
Vibration Amplitude = 40 μm;
Vibration Application Time = 0.5 sec.; and
Length of Welding Mold = 20 mm.

The aforementioned optical power measurement system was used for evaluation of the characteristics of the optical coupler 70. In detail, a first port $CH_1$ was provided with light of a wavelength of 660 nm ($P_1 = 15.4$ $\mu W$) from the light source of the optical power system. The optical power system then received light emerged from a fifth to an eighth ports $CH_5$ to $CH_8$ situated in the opposite side to the first port $CH_1$. Thus, output values $P_5$ to $P_8$ at the ports $CH_5$ to $CH_8$ were measured. The results are the output values $P_5$ of 2.8 $\mu W$, $P_6$ of 2.5 $\mu W$, $P_7$ of 4.1 $\mu W$ and $P_8$ of 2.7 $\mu W$. The divergence ratio is:
1.1:1.0:1.6:1.1.
The excess loss EL is:

$$EL = -10 \cdot \log \frac{2.8 + 2.5 + 4.1 + 2.7}{15.4} = 1.0 \text{ (dB)}$$

Next, description is given on characteristics of a optical coupler 80 with $2^3 \times 2^3$ channels.

Coupling segments were formed by ultrasonic welding under the same conditions as above for the sake of examination of the characteristics.

In this examination, the same optical power measurement system as above was similarly employed. In more detail, a first port $CH_1$ was provided with light of a wavelength of 660 nm (optical power $P_1 = 15.5$ $\mu W$) from the light source (FIG. 13C). Output values $P_9$ to $P_{16}$ were then measured which emerged from the fiber branches 82a, 84a, 86a, 88a, 82b, 84b, 86b, 88b situated in the opposite side to the first port $CH_1$. The results are $P_9$ of 1.32 $\mu W$, $P_{10}$ of 1.33 $\mu W$, $P_{11}$ of 1.28 $\mu W$, $P_{12}$ of 1.30 $\mu W$, $P_{13}$ of 1.20 $\mu W$, $P_{14}$ of 1.35 $\mu W$, $P_{15}$ of 1.30 $\mu W$ and $P_{16}$ of 1.50 $\mu W$. The excess loss EL is:

$$EL = -10 \cdot \log \frac{1.32 + \ldots + 1.50}{15.5} = 1.65 \text{ (dB)}$$

Next, description is given on characteristics of a optical coupler 90 with $2^4 \times 2^4$ channels.

Coupling segments were formed by ultrasonic welding under the same conditions as above for the sake of examination of the characteristics.

In this examination, the same optical power measurement system as above was similarly employed. In more detail, a first port $CH_1$ was provided with light of a wavelength of 660 nm (optical power $P_1 = 15.5$ $\mu W$) from the light source (FIG. 14C). Output values $P_{17}$ to $P_{32}$ were then measured which emerged from the fiber branches 92a to 99a, 92b to 99b situated in the opposite side to the first port $CH_1$. The results are $P_{17}$ of 0.68 $\mu W$, $P_{18}$ of 0.55 $\mu W$, $P_{19}$ of 0.52 $\mu W$, $P_{20}$ of 0.61 $\mu W$, $P_{21}$ of 0.60 $\mu W$, $P_{22}$ of 0.56 $\mu W$, $P_{23}$ of 0.49 $\mu W$, $P_{24}$ of 0.55 $\mu W$, $P_{25}$ of 0.48 $\mu W$, $P_{26}$ of 0.61 $\mu W$, $P_{27}$ of 0.59 $\mu W$, $P_{28}$ of 0.58 $\mu W$, $P_{29}$ of 0.55 $\mu W$, $P_{30}$ of 0.60 $\mu W$, $P_{31}$ of 0.60 $\mu W$ and $P_{32}$ of 0.52 $\mu W$. The excess loss EL is:

$$EL = -10 \cdot \log \frac{0.68 + \ldots + 0.52}{15.5} = 2.31 \text{ (dB)}$$

E-7. Effect of Seventh to Ninth Embodiments

The optical couplers according to the seventh to the ninth embodiments are made only of fiber in the embodiments, which enables equal coefficients of thermal expansion at any portion of the optical couplers. This permits the respective portions to expand (or shrink) at the same rate even with changes in temperature of environment. Thus, the optical couplers are free from severe changes in characteristics thereof caused by changes in room temperature. In addition, coupling segments with enough strength can be attained since the coupling segments are formed either by ultrasonic welding or thermal welding.

F. Hollow Cover for Optical Coupler

It is a common practice to employ resin molding to form a coupling segment of an optical coupler for reinforcing the strength of the coupling segment. Resin molding is necessary not only for this purpose, but also for fixing angles between the fiber branches and the coupling segment. In the optical coupler 40A according to the first embodiment, for example, resin molding fixes angles between the coupling segment 41 and the respective fiber branches 42 and 43 which are to form the first and the second port thereof, as well as angles between the coupling segment 41 and the respective fiber branches 44 and 45 which are to serve as the third and the fourth port. Hence, resin molding of a coupling segment 41 has grave significance.

However, there remains a problem when resin molding is applied to coupling segment of an optical coupler produced in the above manner; namely, excess loss increase.

Examplary measurement of an optical coupler 40A which has a coupling segment 41 molded with epoxy resin will now be discussed. Table 5 shows excess losses. Measurements of the excess losses are as the same as described before.

TABLE 5

| Output: | Input: | | | |
| --- | --- | --- | --- | --- |
| | first port | second port | third port | fourth port |
| first port | — | — | 4.597 $\mu W$ | 4.194 $\mu W$ |
| second port | — | — | 3.208 $\mu W$ | 4.622 $\mu W$ |
| third port | 6.029 $\mu W$ | 2.771 $\mu W$ | — | — |
| fourth port | 2.535 $\mu W$ | 5.996 $\mu W$ | — | — |
| Loss (dB) | 1.37 | 1.27 | 1.77 | 1.24 |

Mean values of the excess losses of Table 1 and Table 5 are calculated, respectively. The mean value of when not employing resin molding is 0.88 dB, whereas that of when employing resin molding is 1.41 dB. In this case, resin molding has increased excess loss by 0.53 dB. This is because input light, which is in propagation mode (i.e., transmissible) when resin molding is not conducted, would be converted into radiation mode due to resin molding.

Figure 15:
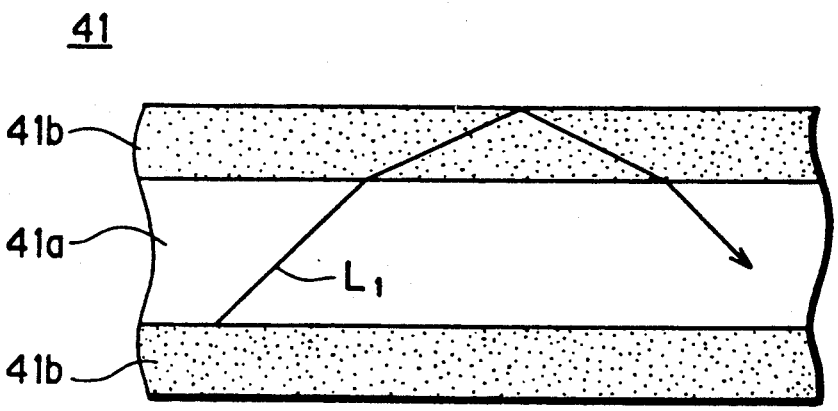
FIGS. 15 and 16 are views schematically showing propagation of light in a coupling segment, respectively.
Figure 16:
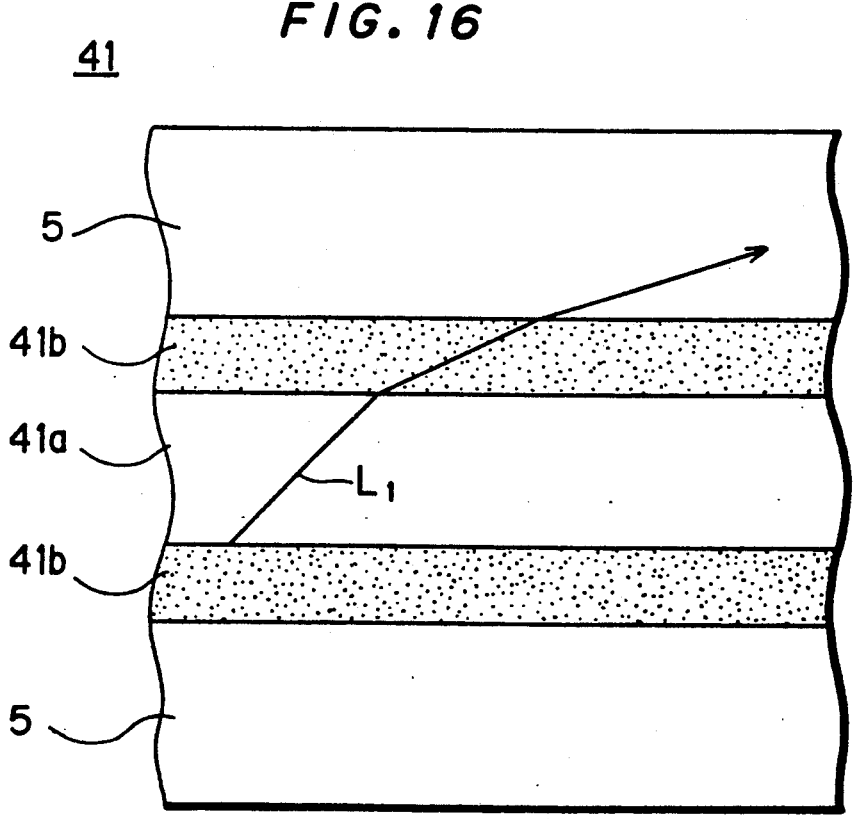

If resin molding is not conducted, incident light proceeds within a coupling segment 41 as shown in FIG. 15. In FIG. 15, light $L_1$ entering at a certain angle of incidence proceeds while successively totally reflected at the interface between an air layer (refractive index $n_0 = 1$) and a clad 41b (refractive index $n_1 > n_0$). In contrast, when resin molding is employed, as shown in FIG. 16, the light $L_1$ enters an epoxy resin 5 across the interface between a clad 41b and the epoxy resin 5. This is because the refractive index $n_2$ of the epoxy resin 5 is generally larger than the refractive index $n_0$ of the air layer. Hence, the proportion of light converted from the propagation mode into the radiation mode increases as the refractive index $n_2$ increases. Accordingly, the excess loss stemming from resin molding increases.

The following method is proposed in order to enhance the strength of a coupling segment while simultaneously fixing angles of fiber branches without increasing excess loss.

Figure 17:
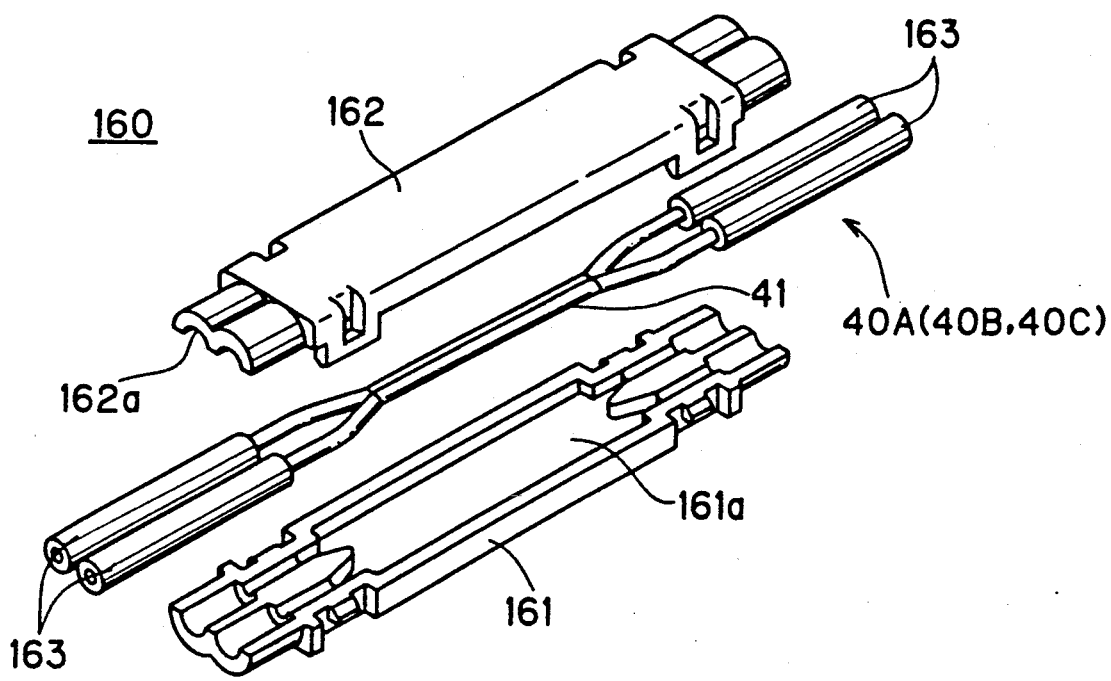
FIGS. 17 and 18 are perspective views of a hollow cover, respectively.
Figure 18:
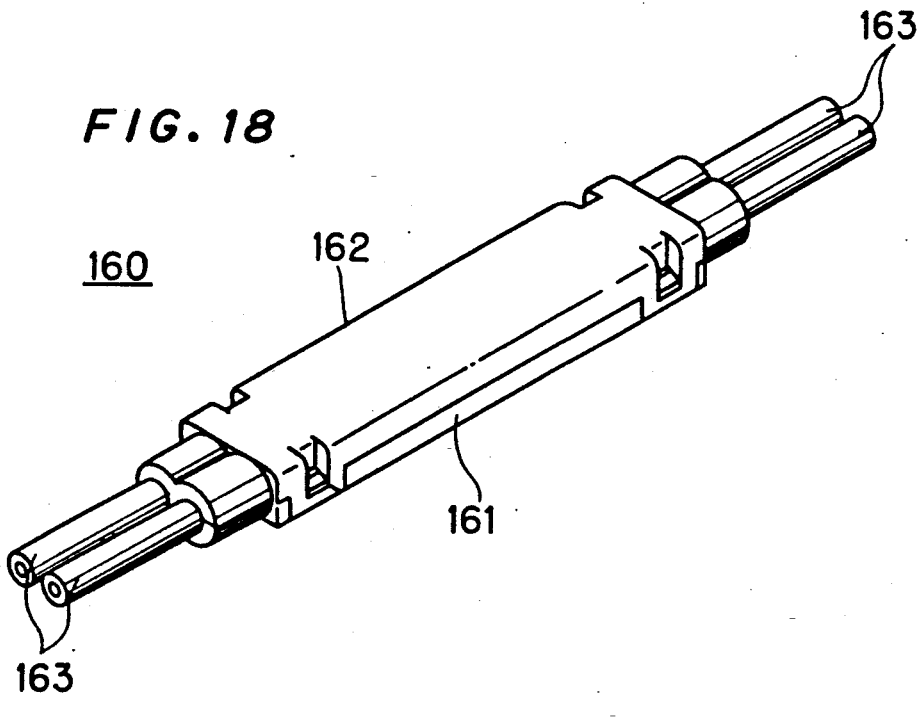

FIGS. 17 and 18 are perspective views of a hollow cover according to the present invention. As in FIG. 17, a hollow cover 60 comprises a pair of cover members 161 and 162 made of epoxy resin. When engaged with each other, the cover members 161 and 162 would serve as one completed member. The upper face of the cover member 161 and the lower face of the cover member 162 are formed so as to conform to the configuration of an optical coupler 40A. The cover members 161 and 162 are moved upward and downward, respectively, into engagement after an optical coupler 40A is placed in a predetermined position (FIG. 18). In consequence, the optical coupler 40A is enclosed by the cover members 161 and 162, and therefore, is protected. Hence, even if external pressure is exerted to the optical coupler 40A, this hollow cover 160 prevents the pressure from acting further on the coupling segment 41. In addition, fiber branches covered with a holding sheath 163 would be firmly held between the cover members 161 and 162. This allows the branch angles of the fiber branches to be fixed.

Figure 19:
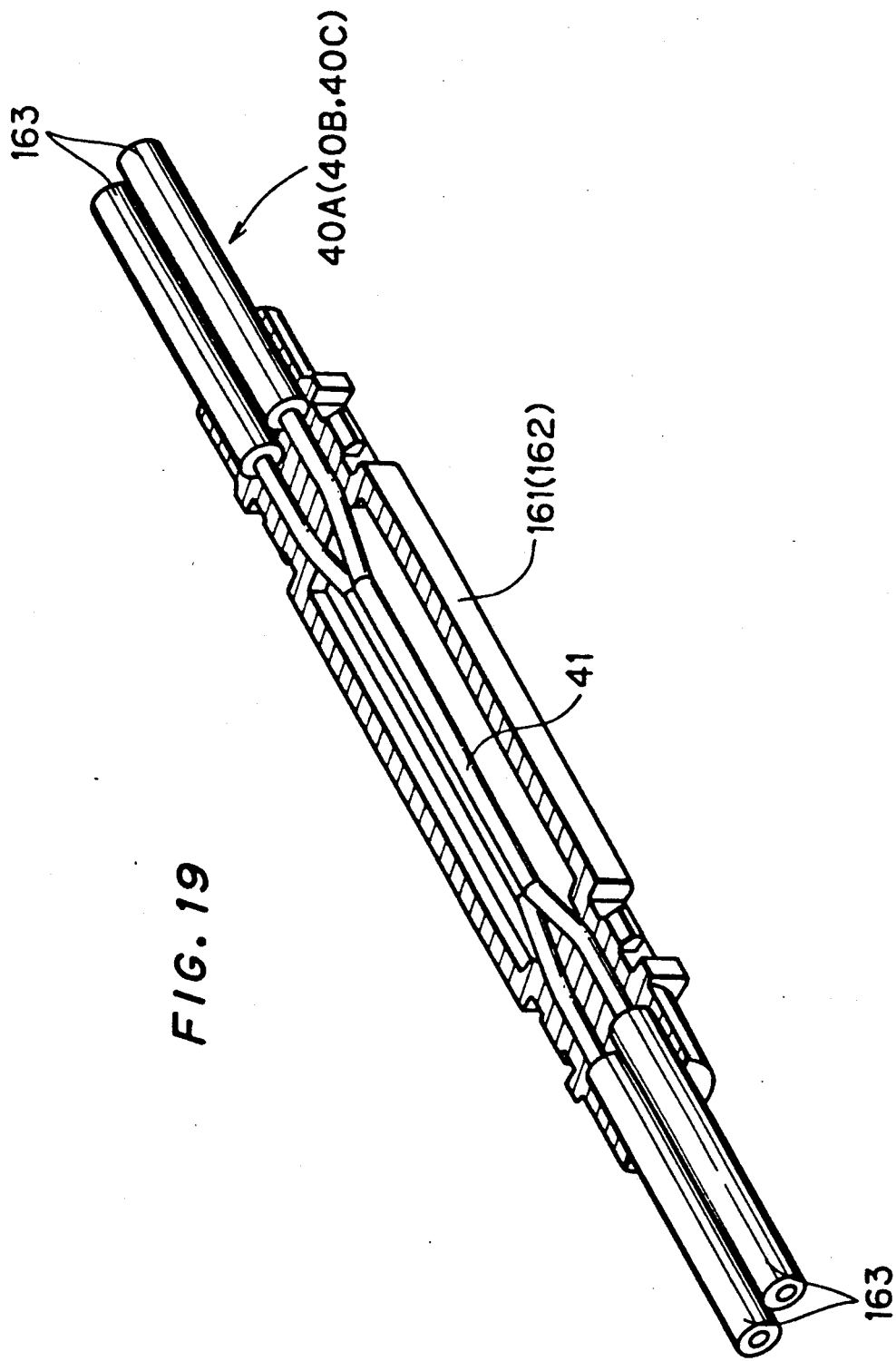
FIG. 19 is a perspective sectional view of the hollow cover of FIGS. 17 and 18.

On the other hand, the coupling segment 41 would be kept wrapped up in an air layer (FIG. 19). Hence, in theory, variation of excess losses does not occur. In order to verify this, excess losses were measured in the same manner as above after protecting the optical coupler 40A by the hollow cover 160. Table 6 shows the results.

TABLE 6

| Output: | Input: | | | |
| --- | --- | --- | --- | --- |
|  | first port | second port | third port | fourth port |
| first port | — | — | 5.222 μW | 4.736 μW |
| second port | — | — | 4.040 μW | 5.025 μW |
| third port | 6.525 μW | 3.263 μW | — | — |
| fourth port | 3.040 μW | 6.435 μW | — | — |
| Loss (dB) | 0.89 | 0.82 | 1.03 | 0.80 |

Calculating from Table 6, the mean value of the losses is 0.88 dB. Thus, even if the coupling segment 41 is covered with the hollow cover 160, the characteristics of the optical coupler 40A are not changed.

In the embodiment above, cover members 161 and 162 are made of epoxy resin. However, it is appreciated that this is not limiting.

Further, the hollow caver 160 can be applied to all of coupling segments of the above optical coupler.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of producing an optical coupler, comprising the steps of:
preparing two all plastic elongate fibers, each of said fibers having a core extending in a predetermined direction;
placing said all plastic fibers in contact with each other such that opposing sides of said fibers contact one another over a predetermined length; and
applying ultrasonic vibration to said contacting portion of said all plastic fibers so as to bond said cores with each other at said contacting portion, said vibration being applied to said fibers in a direction perpendicular to a direction of elongation of said fibers.

2. A method of claim 1, wherein said core is surrounded by a clad.

3. A method of claim 2, further comprising the step of removing said clad along said contacting portion so as to expose said core at said contacting portion prior to said step of placing said all plastic fibers.

4. A method of claim 3, wherein said step of placing said all plastic fibers includes the step of placing said exposed portions of said all plastic fibers in contact with each other.

5. A method of claim 3, wherein said clad is removed from said core by etching.

6. A method of claim 3, wherein said clad is removed from said core by polishing.

7. A method of claim 1, wherein said step of placing said all plastic fibers includes the step of disposing said all plastic fibers in parallel juxtaposition with each other.

8. A method of claim 1, wherein said step of applying ultrasonic vibration includes the step of pressing said all plastic fibers against each other.

9. A method of claim 1, further comprising the step of covering said bonding portion with a hollow cover while angular relation between four fiber branches is maintained by said hollow cover, two of said fiber branches extending from one end of said bonding portion, the remainder extending from other end of said bonding portion.

10. A method of producing an optical coupler, comprising the steps of:
preparing a plurality of all plastic elongate fibers each of which has a core;
placing said all plastic fibers in branching off relation, each downstream portion of said all plastic fiber in the upstream side being in contact with an upstream portion of said all plastic fiber in the downstream side along opposing side portions thereof; and
applying ultrasonic vibration to said contacting portions of said all plastic fibers in a direction perpendicular to a direction of elongation of said fibers so as to bond said cores with each other at every contacting portion.

11. A method of producing an optical coupler, comprising the steps of:
preparing a first all plastic elongate fiber;
placing a plurality of second all plastic elongate fibers in branching off relation from a downstream portion of said first all plastic fiber, each downstream portion of said all plastic fiber in the upstream side being in contact with an upstream portion of said all plastic fiber in the downstream side along opposing side portions thereof;
placing a plurality of third all plastic fibers in branching off relation from an upstream portion of said first all plastic fiber, each downstream portion of said first all plastic fiber in the upstream side being in contact with an upstream portion of said all plastic fiber in the downstream side along opposing side portions thereof, each of said first to third all plastic fibers having a core; and
applying ultrasonic vibration to said contacting portions of said all plastic fibers in a direction perpendicular to a direction of elongation of said fibers so as to bond said cores with each other at every contacting portion.

12. A method of producing an optical coupler comprising the steps;

preparing a first and a second optical coupler each of which has $2^n$ ($n \geq 1$) input fiber branches and $2^n$ output fiber branches, said input fiber branches serving as an input port, said output fiber branches serving as an output port;

placing said output fiber branches of said first optical coupler in contact with said output fiber branches of said second optical coupler along opposing side portions thereof with a one-to-one correspondence; and applying ultrasonic vibration to said contacting portions of said all plastic fibers in a direction perpendicular to a direction of elongation of said fibers so as to bond said cores with each other at every contacting portion.

13. An optical coupler, comprising;
a plurality of all plastic elongate fibers disposed in branching off relation, each of said all plastic fibers having a core; and
a plurality of bonding portions at which two cores of said all plastic fibers are bonded with each other,
wherein each downstream portion of said all plastic fiber in the upstream side is fused to an upstream portion of said all plastic fiber in the downstream side at every bonding portion with opposing sides of said fibers contacting one another at said bonding portion, and wherein each of said bonding portions is formed by applying ultrasonic vibration thereto in a direction perpendicular to a direction of elongation of said fibers at said bonding portions.

14. An optical coupler, comprising;
a first all plastic elongate fiber;
a plurality of second all plastic elongate fibers disposed in branching off relation from a downstream portion of said first all plastic fiber, each downstream portion of said all plastic fiber in the upstream side being in contact with an upstream portion of said all plastic fiber in the downstream side along opposing side portions thereof;

a plurality of third all plastic fibers disposed in branching off relation from an upstream portion of said first all plastic fiber, each downstream portion of said all plastic fiber in the upstream side being in contact with an upstream portion of said all plastic fiber in the downstream side along opposing side portions thereof, each of said first to third all plastic fibers having a core; and a plurality of bonding portions at which two cores of said all plastic fibers are bonded with each other,
wherein each downstream portion of said all plastic fiber in the upstream side is fused to an upstream portion of said all plastic fiber in the downstream side at every bonding portion by applying ultrasonic vibration to said bonding portions in a direction perpendicular to a direction of elongation of said fiber.

15. An optical coupler, comprising:
a first and a second optical coupler each of which has $2^n$ ($n \geq 1$) input fiber branches and $2^n$ output fiber branches, said input fiber branches serving as an input port, said output fiber branches serving as an output port; and a plurality of bonding portions at which two cores of said all plastic fibers are bonded with each other,
wherein said output fiber branches of said first optical coupler are fused to said output fiber branches of said second optical coupler along opposing sides thereof with a one-to-one correspondence by applying ultrasonic vibration to said bonding portions in a direction perpendicular to a direction of elongation of said fibers, whereby said bonding portions are formed.

* * * * *